(12) United States Patent
Rapp et al.

(10) Patent No.: US 7,917,815 B2
(45) Date of Patent: Mar. 29, 2011

(54) MULTI-LAYER CONTEXT PARSING AND INCIDENT MODEL CONSTRUCTION FOR SOFTWARE SUPPORT

(75) Inventors: Roman Rapp, Villeneuve-Loubet (FR); Barbara Bendjama, Cagnes sur mer (FR); Martin Kaisermayr, Antibes (FR); Marielle Salinas, Mougins (FR); Olena Kushakovska, Cannes (FR); Jean-Pierre Djamdji, Nice (FR)

(73) Assignee: SAP AG, Walldorf (DE)

( * ) Notice: Subject to any disclaimer, the term of this patent is extended or adjusted under 35 U.S.C. 154(b) by 267 days.

(21) Appl. No.: 12/199,772

(22) Filed: Aug. 27, 2008

(65) Prior Publication Data

US 2010/0058113 A1 Mar. 4, 2010

(51) Int. Cl.
*G06F 11/00* (2006.01)
(52) U.S. Cl. .......................................... 714/57
(58) Field of Classification Search .......... 714/2–4, 714/15, 16, 18, 20, 21, 26, 37–39, 47
See application file for complete search history.

(56) References Cited

U.S. PATENT DOCUMENTS

| 5,414,836 | A  | * | 5/1995  | Baer et al. ..................... 714/38 |
| 6,177,932 | B1 |   | 1/2001  | Galdes et al. |
| 6,266,788 | B1 | * | 7/2001  | Othmer et al. ................. 714/38 |
| 6,336,139 | B1 | * | 1/2002  | Feridun et al. ................ 709/224 |
| 6,957,206 | B2 |   | 10/2005 | Nolan |
| 7,386,541 | B2 |   | 6/2008  | Pal et al. |
| 7,571,179 | B2 | * | 8/2009  | Meyers et al. ..................... 1/1 |
| 7,574,652 | B2 |   | 8/2009  | Lennon et al. |
| 2003/0195775 | A1 | * | 10/2003 | Hampton et al. ................ 705/3 |
| 2004/0015823 | A1 |   | 1/2004  | Nolan |
| 2004/0139106 | A1 |   | 7/2004  | Bachman et al. |
| 2004/0199905 | A1 |   | 10/2004 | Fagin et al. |
| 2005/0033626 | A1 |   | 2/2005  | Kruse et al. |
| 2005/0033631 | A1 |   | 2/2005  | Wefers et al. |
| 2005/0138486 | A1 |   | 6/2005  | Gromyko |
| 2006/0026467 | A1 | * | 2/2006  | Nehab et al. ..................... 714/38 |
| 2006/0041869 | A1 | * | 2/2006  | Houston et al. ................ 717/131 |
| 2006/0112106 | A1 |   | 5/2006  | Wolf et al. |
| 2006/0143034 | A1 |   | 6/2006  | Rothermel et al. |
| 2006/0259272 | A1 |   | 11/2006 | Sattler et al. |
| 2007/0050678 | A1 | * | 3/2007  | Estes et al. ..................... 714/38 |
| 2007/0136342 | A1 |   | 6/2007  | Singhai et al. |
| 2007/0164849 | A1 |   | 7/2007  | Haeberle et al. |
| 2007/0174260 | A1 |   | 7/2007  | Bachman et al. |
| 2007/0174716 | A1 | * | 7/2007  | Erdtmann et al. .............. 714/39 |

(Continued)

OTHER PUBLICATIONS

Office Action for U.S. Appl. No. 12/199,773, mailed Dec. 28, 2010, 7 pages.

*Primary Examiner* — Nadeem Iqbal
(74) *Attorney, Agent, or Firm* — Brake Hughes Bellermann LLP

(57) ABSTRACT

A context analyzer may be configured to receive, from a software support system associated with a software application associated with multiple architectural layers, an incident report associated with a software incident of the software application. The incident report may include context information associated with the software application at the time of the software incident, the context information being received from a plurality of context providers. An incident model generator may be configured to determine, from parsed context information output by a first context parser and a second context parser, a plurality of entities and links therebetween associated with the software application, and configured to display an incident model that includes the entities and the links and that provides access to the parsed context information on an entity-specific basis.

20 Claims, 14 Drawing Sheets

U.S. PATENT DOCUMENTS

2007/0294258 A1* 12/2007 Caldwell et al. ................ 707/10
2008/0071766 A1 3/2008 Grieselhuber et al.
2008/0104455 A1* 5/2008 Ramarajar et al. ............ 714/100
2008/0262860 A1 10/2008 Schneider et al.
2010/0057677 A1* 3/2010 Rapp et al. ........................ 707/3

* cited by examiner

FIG. 9

MULTI-LAYER CONTEXT PARSING AND INCIDENT MODEL CONSTRUCTION FOR SOFTWARE SUPPORT

TECHNICAL FIELD

This application relates to software support and, more particularly, to servicing, administering, or otherwise supporting software applications.

BACKGROUND

Organizations and businesses depend on software deployed throughout their computing infrastructures to perform tasks relevant to their respective fields. As these entities begin using more enterprise software solutions, enterprise-wide software support becomes a necessary corollary to the software itself, as technical issues and performance errors may inevitably arise during the software's normal operations. For example, a customer may experience technical errors affecting the operations of the current software. In some support solutions, the customer may be required to submit or report the error through a manual process. Upon receiving the error report or notice, the support provider may manually analyze the error, diagnose the problem, and determine the proper solution. Once found, the support provider may relay the solution to the customer, who may then attempt to implement the steps of the provided solution. In some of these situations, such as those involving a customer support phone hotline, the customer generally needs a rudimentary level of knowledge regarding the software to ensure that the dialog between the technical consultant and the customer is clear enough to allow for a successful resolution to the issue.

In other support solutions, a searchable knowledge base may be provided. Thus, when an error occurs, the customer may manually search a listing of provided solution documentation for common errors that may occur within the software application. For more robust software applications, the related knowledge base may include multiple levels of solutions, requiring significant time and effort by customers to find, and then decipher, the correct solution. Even after locating a suitable solution, implementing the steps may be too difficult for customers without advanced knowledge of or access to the application. In some situations, the support provider may offer a help desk where customers may submit a ticket describing an error. The ticket may be reviewed by an employee of the solution provider, who then analyzes the error and attempts to provide solutions.

The set of current support solutions normally require both customers and support providers to manually generate potential solutions. Thus, customer support requires time- and resource-consuming actions. Some errors may occur frequently, giving the support provider the experience necessary to quickly solve the customer's error. Other errors, however, may occur much less frequently, thus prompting the support provider or the customer to spend larger amounts of time searching for relevant solutions.

SUMMARY

According to one general embodiment, a system includes a context analyzer configured to receive, from a software support system associated with a software application associated with multiple architectural layers, an incident report associated with a software incident of the software application. The incident report may include context information associated with the software application at the time of the software incident, the context information being received from a plurality of context providers, including a first context provider associated with a first architectural layer of the software application and a second context provider associated with a second architectural layer of the software application. The context analyzer may include a plurality of context parsers, each associated with a layer of the multiple architectural layers of the software application, and each configured to parse context information from a corresponding one of the plurality of context providers. The context analyzer may include an incident model generator configured to determine a use of the first context provider and the second context provider from among the plurality of context providers, and configured to activate a first context parser and a second context parser from the plurality of context parsers, based thereon. The incident model generator may be further configured to determine, from parsed context information output by the first context parser and the second context parser, a plurality of entities and links therebetween associated with the software application, and configured to display an incident model that includes the entities and the links and that provides access to the parsed context information on an entity-specific basis.

According to another general aspect, a method includes receiving, from a software support system associated with a software application associated with multiple architectural layers, an incident report associated with a software incident of the software application, the incident report including context information associated with the software application at the time of the software incident, the context information being received from a plurality of context providers including a first context provider associated with a first architectural layer of the software application and a second context provider associated with a second architectural layer of the software application. A use of the first context provider and the second context provider from among the plurality of context providers may be determined. A first context parser and a second context parser may be determined from plurality of context parsers, based thereon, and the context information may be parsed at the first context parser and the second context parser to obtain parsed context information. From the parsed context information, a plurality of entities and links therebetween that are associated with the software application may be determined, and an incident model may be displayed that includes the entities and the links and that provides access to the parsed context information on an entity-specific basis.

According to another general aspect, a system may include a computing device and instructions stored on a computer readable medium and that, when executed on the computing device, cause the computing device to receive, from a software support system associated with a software application associated with multiple architectural layers, an incident report associated with a software incident of the software application, the incident report including context information associated with the software application at the time of the software incident, the context information being received from a plurality of context providers including a first context provider associated with a lower architectural layer of the software application and a second context provider associated with a higher architectural layer of the software application. The instructions may further cause the computing device to determine a use of the first context provider and the second context provider from among the plurality of context providers, activate a first context parser and a second context parser from the plurality of context parsers, based thereon, parse the context information at the first context parser to obtain first parsed context information, parse the first parsed context information at the second context parser to obtain second parsed context information, determine, from the first and second parsed context information, a plurality of entities and links therebetween that are associated with the software application, and display an incident model that includes the entities and the links and that provides access to the first and second parsed context information on an entity-specific basis.

BRIEF DESCRIPTION OF THE DRAWINGS

FIG. 9 is an example screenshot of context information collected by an example context provider of the system of FIG. 4 at an example architectural layer.

DETAILED DESCRIPTION

Figure 1:
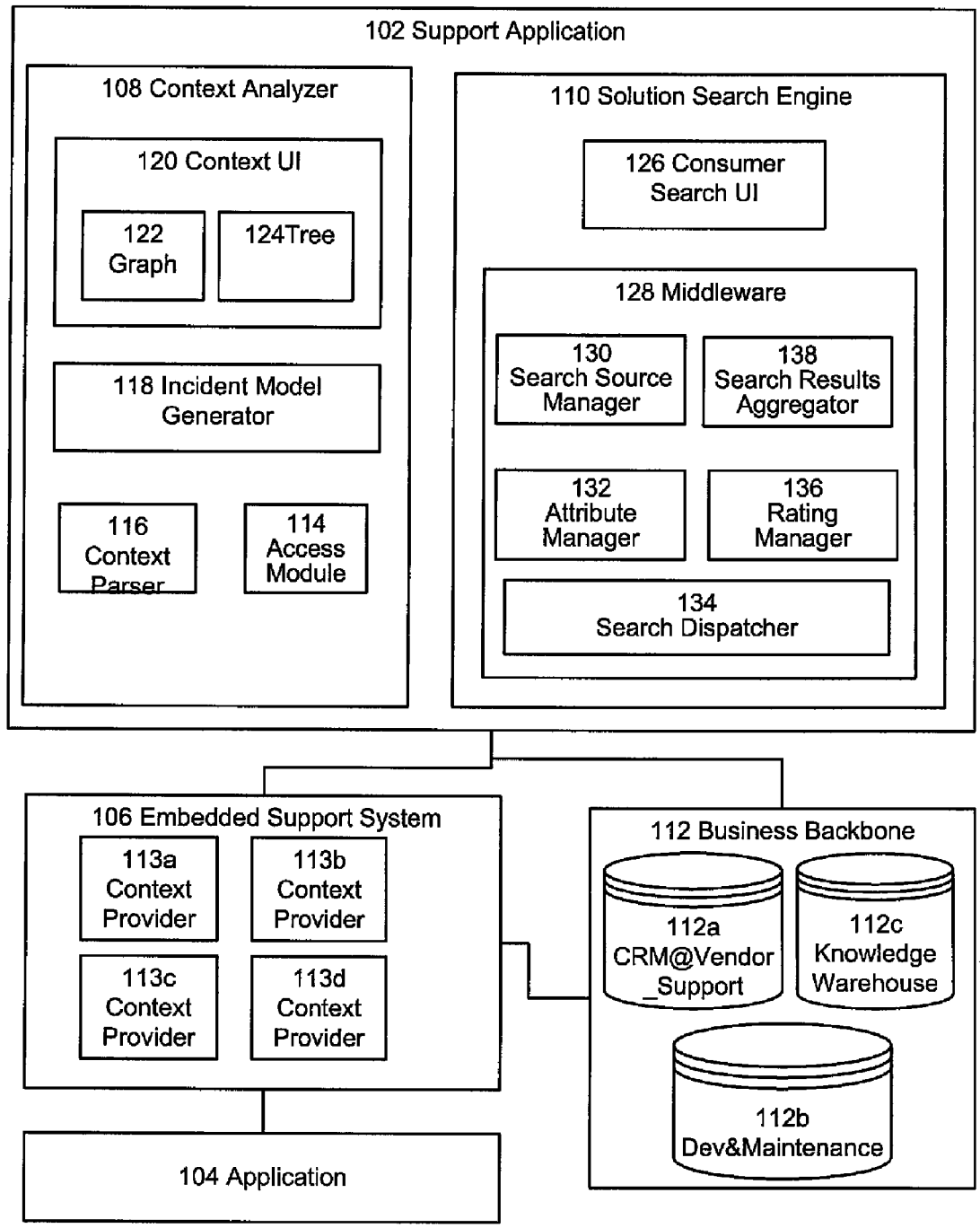
FIG. 1 is a block diagram of a system for context analysis and solution search for software support.

FIG. 1 is a block diagram of a system for context analysis and solution search for software support. In the example of FIG. 1, a support application 102 provides support for an application 104, such as a business application, that may be running, e.g., at a customer site(s). Software support may be provided by a vendor or other provider of the application 104, illustrated in the example of FIG. 1 as embedded support system 106.

In the example of FIG. 1, it may occur that an incident occurs at the application 104 as experienced by the customer. For example, the application 104 may not perform as desired, e.g., may perform a function incorrectly, or may not perform a desired function at all. In FIG. 1, the embedded support system 106 may be operable to determine information about the incident, where such information may include, for example, static or dynamic (e.g., current) information about the application 104, or about hardware/software used by the customer to implement the application 104, or used in conjunction with implementation of the application 104. The embedded support system 106 may further provide, for example, information about one or more users of the application 104, or information provided by the user(s) regarding the user, or information about potential solutions/corrections for the incident. These illustrative and non-limiting examples of information that may be provided by the embedded support system 106 demonstrate the fact that the embedded support system 106 may output a relatively large amount of potentially non-homogeneous, non human-readable information regarding the incident. For example, the embedded support system 106 may output these and other types of information as a large number of eXtensible Mark-up Language (XML) documents, which may vary in format relative to one another and which may, in any case, be unsuitable for human review and consumption in any practical sense.

Consequently, the support application 102 may include a context analyzer 108 that is operable to receive the non-homogeneous, non human-readable information, and to convert this information for presentation to a user (e.g., to support personnel of the software vendor for the application 104). The context analyzer 108 performs this conversion in a manner that is efficient and that takes advantage of available resources to present the information to the support user in a manner that allows the support user to quickly visualize and/or understand the incident and the relevant, surrounding circumstances. Then, a solution search engine 110 may be used by the support user, for example, to receive the converted information regarding the incident, and to determine (i.e., search for) a possible solution(s) to the incident.

In the example of FIG. 1, a business backbone 112 is illustrated that may represent a global or vendor-wide data store of information relevant to vendor-supplied software applications, including the application 104. For example, for an application such as Customer Relationship Management (CRM) applications, and other applications, the business backbone 112 may include data 112a, 112b, 112c related to, respectively, CRM support data applications (storing, e.g., customer-specific data at the vendor), development and maintenance data (which may include specific information about such a CRM application at a particular customer), and knowledge warehouse data. Thus, as may be appreciated, such data may provide information to vendor support personnel or other users such as previously recognized incidents and solutions or other information useful in recognizing or resolving incidents determined by the embedded support system 106. In the example of FIG. 1, the business backbone 112 may store or access customer configuration data related to a customer having the application 104 installed/configured locally, so as to use this information in resolving reported incidents. Further in this example, the business backbone 112 may include one or more software models upon which the application 104 may be based, as described in more detail below.

In FIG. 1, then, the context analyzer 108 may receive a report of an incident from the embedded support system 106, along with various types of contextual information related to the incident. In this regard the embedded support system 102 may be considered to include various context providers 113a, 113b, 113c, 113d having different properties (e.g., interfaces) which are dependent on factors such as, for example, local hardware/software platforms of the application 104. These context providers may provide context information as described above, e.g., in different, non human-readable documents. For example, different context providers may provide XML documents which are formatted (e.g., tagged) differently from one another, so that, for example, it may be difficult to recognize when the two documents contain the same or related information. Further, one or more context providers may each be associated with a different software layer and/or platform (e.g. ABAP, Java, .NET) used to implement the application 104, such as a User Interface (UI) layer, an object layer, or an application server layer, so that context information produced by these context providers may further be inhomogeneous in construction and presentation, and so that resulting documents describing the context information may also be difficult for human users to utilize in an efficient and practical way.

Such documents or other context information may be received at an access module 114 of the context analyzer 108, and/or at a context parser 116 of the context analyzer 108. For example, the access module 114 may receive an incident message and context information about a software incident, and may be responsible for separating/categorizing different incidents or otherwise maintaining consistency of the received information.

The access module 114 also may be responsible for accessing the business backbone 112, in order to enhance or modify the received incident message and context information. For example, the access module 114 may access customer configuration information from the business backbone 112, and/or may access model information (i.e., may access one or more models which were used to design or modify the application 104 or relevant portions thereof), as described in more detail herein.

The context parser 116, as just referenced, may be configured to receive the incident/context information, and to provide a uniform, human-readable version or model of this information. For example, as referenced above, different context providers of the embedded support system 106 may provide incident and context information differently from one another, such as may occur between a system context provider and a user interface (UI) context provider, or as may occur when multiple organizations or platforms are involved with the application 104 (or user thereof). Then, in some implementations, the context parser 116 may use and/or create a new interface to provide a uniform access for an incident model generator 118 for different context providers. For example, a separate implementation of the interface (context parser 116) per context provider may be implemented. Additional, alternative, and/or more detailed examples of the operation(s) of the context parser 116 are provided herein.

Thus, the incident model generator 118 may output an incident model as a uniform representation of a particular incident and associated context information, as well as any information used to enrich/enhance the incident/context information (such as the customer configuration or software model(s)) as provided by the context parser 116 and/or the access module 114. The resulting incident model may be provided to a support user or other user using a context UI 120, by way of which the incident model may be presented, for example, as a graph 122 or a tree 124.

Once the incident model is constructed, the solution search engine 110 may be implemented to determine possible solutions to the incident in question. In general, the solution search engine 110 may search relevant memories, such as, for example, previous solutions to the same or similar incident(s), model information related to a model(s) upon which the application 104 was constructed, or configuration information related to how the application 104 may be configured for implementation at the site of the particular customer/user.

A consumer search UI 126 may be included that allows the support user to construct search queries for solutions to the relevant incident. In some implementations, fields of the consumer search UI 126 may be auto-filled based on the incident model generator 118. In some implementations, the solution search may occur over a number of different platforms and/or organizations. Further, the searches may vary depending on local customer configurations and other relevant parameters.

In the example of FIG. 1, search middleware 128 may be included to allow for searching of such heterogeneous search arenas, and for presentation thereof in a uniform and consistent manner within the consumer search UI 126. Examples of the solution search engine 110, the consumer search UI 126, and the search middleware 128 are provided in detail, below.

As referenced above, the access module 114 may be used to enhance context information received from the embedded support system 106. One aspect of enhancing the contextual information may include accessing the data from a highly modeled Enterprise Service-Oriented Architecture (eSOA), and to access customer specific information in a support business backbone such as the business backbone 112 (e.g. configuration, system installation information, or recent incidents and solutions). In some implementations, then, rules and methods may be used to generically access the needed information depending on customer specific data, like software component, version, and/or configuration settings in different systems. Related techniques may be used for more traditional, non-modeled environments, as described herein.

The access module 114 may include or access an incident adaptor (not shown in FIG. 1) which may be used to read incidents. In general, for example, incidents can be read locally in a customer system or via a remote interface provided by the Business Backbone 112 (e.g., a CRM backbone). Depending on whether some or all of the support application 102 is running in the customer environment or in a vendor support environment, the incident adapter interface may allow for reading of the incident data seamlessly, hiding technical aspects of the source of information, including system address.

Figure 2:
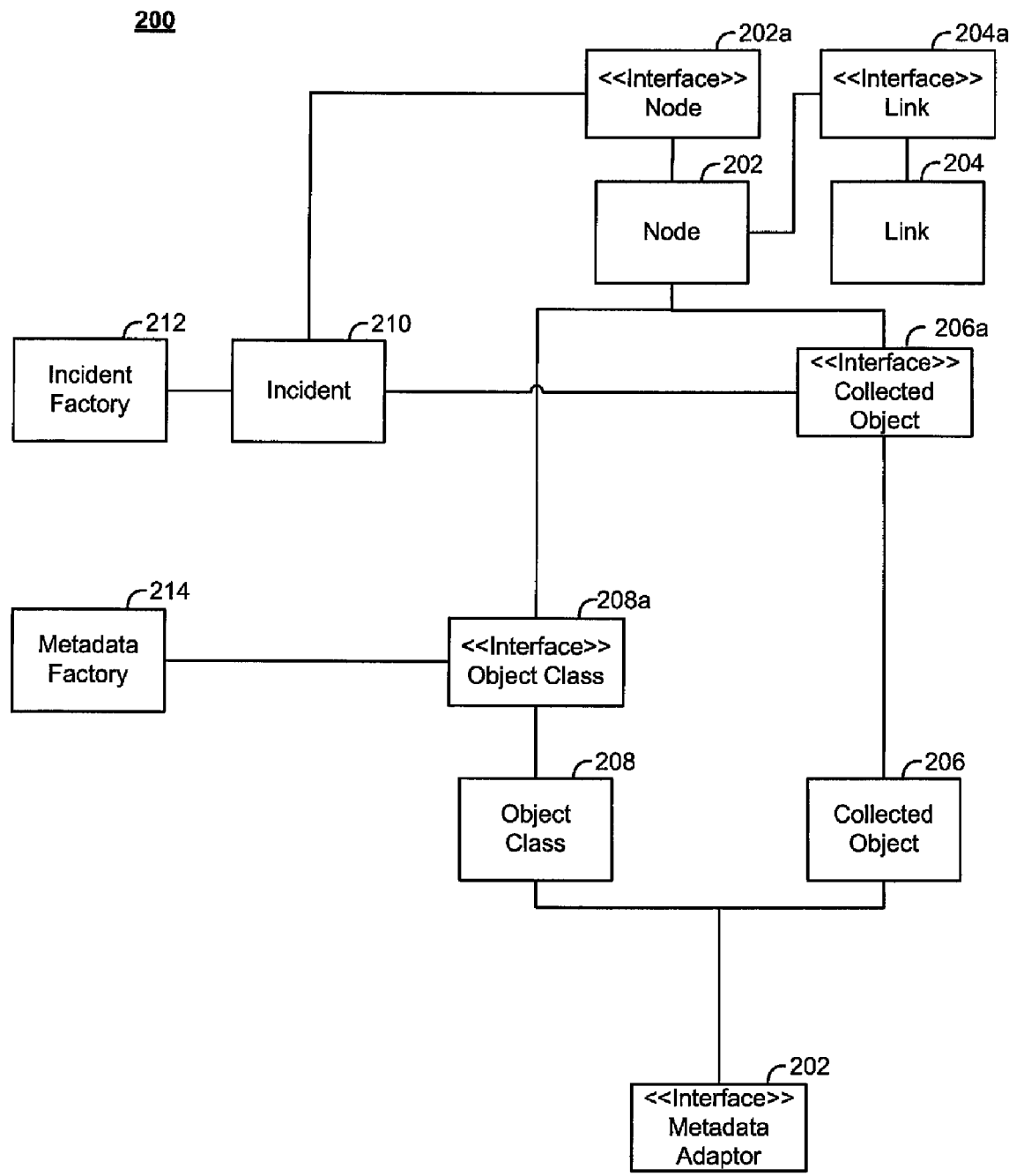
FIG. 2 is a block diagram of an incident model of FIG. 1

As referenced above, the context parser 116 allows for analysis of incident/context information to provide heterogeneous, non human-readable information into consistently-presented, visually-convenient information, such as in, for example, the incident model of FIGS. 1 and 2. More specifically, context information may be collected for an incident message at the embedded support system 106 and the resulting information may be automatically routed to a key user for software support. The context information may be attached to the incident (message) in a technical (e.g. XML format) and inhomogeneous way (e.g. different context providers for eSOA, system or UI information) that is not easily readable by human beings. The key user is supposed to analyze this information to proposal a solution for the incident.

For example, incident context handling may be a complex process with many involved parties/organizations, such as may be involved in platform development or infrastructure development. Each such organization may have its own standards for interface specifications and context collection. In practice this may lead to a complex interaction between all of the parties, and differences in final status, structure and content of different context providers.

The context parser 116 may thus be configured to be instrumental to receive, parse, harmonize and enhance the different context information to provide the base to re-convert such information into easily human readable information and to be later able to store it in an internal format and present it to a key user, e.g. a customer application manager, hosting provider administrator or vendor support employee. Especially in a highly modeled Enterprise Service-Oriented architecture, as described herein, the enhancement may be used to leverage the available metadata information.

In some implementations, as referenced above, a new interface may be created to provide a uniform access from/for the incident model generator 118 for different context providers, e.g., one or more specialized context parsers within the context parser 116 may be used for corresponding context provider(s), each having (or having access to) a common interface with the incident model generator 118. Thus, e.g., a separate implementation of the interface per context provider may be implemented. The creation of the instances of the context parsers and processing of the context fields may be managed by the incident and depends on the context attachments available in the incident. The context parsing is capable of processing attachment XML files which undergo certain changes, such as, for example, a change in the naming scheme(s) or sequence of XML tags, or addition of new tags which is silently ignored by older implementations (without program termination). The context providers may collect the information on, for example, User Interaction, Technical Component, Software Components, Business Objects, Agents, Communication Messages and UI involved in the incident. As described, in order to present the complete picture of the incident the context collected by the providers may be enhanced with information available from Enterprise Service modeling.

A name of the context provider (e.g., supplied by the vendor) may be the basis for determining the implementing class and the return parameters type for the parsing of XML content of the provider. Information provided by ABAP, Java or .NET context providers may be treated likewise and information may be harmonized within the incident.

To ensure the correct versioning of the metadata of the entities involved in the incident, the file of a Software Component context provider (e.g., an ABAP software component provider) may be processed first, as a common context parser used to parse context information of all available context providers. The context attachments of the incidents of other context providers may be parsed without specific order. A parse_context( ) method may be used to process provider-specific XML tags or may use predefined structures to extract the information from XML files into predefined tables. The results of the parsing may be processed immediately and the relevant incident entities are created. The context and/or error information available within each context provider may be assigned to the entities. The semantical links between the incident entities which can be extracted from context providers are created. The Enterprise Service Repository Information is used to create additional links which may not be available within context providers. Thus, the structure of the incident entities in a humanly-readable way and form as such is ensured during context parsing.

As referenced above, the incident model output by the incident model generator 118 may refer to a standardized model to store the harmonized, enhanced, collected incident contextual information in a pre-defined structure (e.g., a net-like structure) including the possibility to enrich it with metadata from a highly modeled Enterprise Service-Oriented architecture like SAP Application Platform and to save the collected information in a database.

FIG. 2 is a block diagram of the incident model of the incident model generator 118 of FIG. 1, and the following discussion is partially in reference thereto. For example, as shown in FIG. 2, the incident model may, for example, contain the following basic entities: nodes 202 (and interfaces 202a), links 204 (and interfaces 204a), collected objects 206 (and interfaces 206a), object classes 208 (and interfaces 208a), incidents 210, an incident factory 212, and a metadata factory 214.

As shown, then, such a net structure may be represented and fully defined by nodes and by links connecting the nodes. Depending on its category, a node represents either a collected object, or an object class. An object class 208 may represent an object within a service oriented architecture (SOA object). Examples are Business Objects, Business Object Nodes, Messages, Deployment Units, and UIs. An object class may be instantiable or may be abstract. Each collected object 206 refers to exactly one object class, while an instantiable object class may be referred to by several collected objects. A collected object represents a specific SOA object instance that has been collected during the incident creation.

For example, an object class 'Business Object Sales Order', may be referred to by the collected objects 'Sales Order 100011' and 'Sales Order 100012'. Hence, the collected object holds the contextual information belonging to a specific instance of a SOA object, while the object class holds the metadata common to all instances of this SOA object. In the example, the object class 'Business Object Sales Order', specifies that a sales order has one or several items, with a certain attributes and their properties. The collected object 'Sales Order 100011' contains the actual values of these attributes for the specific sales order 100011.

Both the object class as well as the collected object may have access to a layer that provides them with metadata of the SOA model. The object class has this access to retrieve metadata information on the object, like its structure and general properties, by way of a metadata adaptor 216. The collected object 206 might need this access in order to get information necessary to interpret specific collected values.

The metadata information requested by the object class will in general be related to the specific SOA object represented by this object class (e.g. the structure of the sales order item), while the collected object will in general need data that is not object specific but situated rather at the attribute level (e.g. a code list, needed to interpret the value of a specific code). In a specific implementation of this concept, the object class and the collected object might be represented by abstract classes. From the abstract class representing the object class, concrete class might be derived by inheritance, one for each SOA object. From the abstract class representing the collected object, concrete classes might inherit for each instantiable SOA object, where potentially instance data might be collected at run time.

A totality of the data that has been collected for one incident may be represented by the incident entity 210. Since each node corresponds to a specific incident, nodes may be stored by incidents. Since each collected object corresponds to a specific incident, collected objects also may be stored by incidents. Since an object class may occur in different incidents, the object class instances need not be stored by an incident, but in an independent entity, shown in FIG. 2 as the metadata factory 214. If the incidents are created on the basis of software that is available in different releases, a possible implementation might be to allow one metadata factory instance per release. Another example approach would be to implement the metadata factory as a singleton (i.e., allow only one metadata factory instance overall) and implement the release information as an attribute of the object class. The different incidents may be handled by the incident factory, which may be the main entry point for all external calls. The incident factory 212 also may be implemented as a singleton.

There are a number of example use cases for external applications that may be covered by an API of the incident model 200. For example, the API may be configured to read the entire net structure of a specific incident, e.g. to display it as net or to transform it into a tree like hierarchy. In this case, the consumer of the API may retrieve a desired incident factory instance. From the incident factory instance the consumer may retrieve the relevant incident, and from the incident the consumer may retrieve the list of nodes and links that define the net.

In another example, the API may be configured to access the collected data of a collected object represented by a specific node. In this case, the consumer of the API may retrieve the desired incident factory instance. From the incident factory instance the consumer may retrieve the relevant incident. From the incident the consumer may retrieve the required node instance. From this node instance the consumer may retrieve the corresponding collected object. The collected object provides its collected data.

In another example, the API may be configured to access metadata corresponding to an object class represented by a specific node. In this case, the consumer of the API may retrieve the desired incident factory instance. From the incident factory instance the consumer may retrieve the relevant incident. From the incident the consumer may retrieve the required node instance. Depending on the node category, the relevant object class might be associated to the node either directly or via a collected object. In the first case, the consumer will retrieve the object class instance directly from the node instance. In the second case, the consumer will first retrieve the collected object instance from the node and then the object class instance from the collected object instance. From the object class instance the consumer can then retrieve the relevant metadata information.

To enable a support user to analyze the incident model, there may be ways to display it on a screen, such as the context UI 120. One alternative is to display the incident data in a graphical format, underlying the network structure of the data, as well as the object relationships within this incident, which allows the support (key) user to have an instantaneous global picture of the incident. For example, the graphical tool used for display may be the SAP Maestro tool.

For example, an Incident model generator 118 may be a complex representation with many involved objects, such as Business Objects, Process Components, Development Units, and agents. Each of these Objects may have a special role and may only exist under special conditions. In practice this may lead to a complex interaction between all of the parties, and a complex representation.

The context UI 120 may thus relate to how to create, starting from the incident model 200, the object hierarchical information as well as their relationships. These relationships can then be described in any required format for rendering. For example, a Process Interaction Model XML file may be generated for display by, e.g., the SAP Maestro rendering tool. As the PIM makes use exclusively of Business Object entities, Associations are searched between Business Object instances. Relationships to other instances may exist but need not be used for the PIM model.

Incident entities may be gathered out of the incident, filtered on a Business Object level, and processed for building up the relationships. As the Business Object may be a complex data representation, holding many nodes, with many levels, embedded in each other, each node being able to be linked to any other Business Object Node, and as the PIM makes use of Business Objects only, the search procedure may be done recursively, in two main directions: Downward (from the Business Object root node level towards its nodes) and Upward (from the Business Object node level to its main root parent).

In some examples, first the search is made, for one Business Object entity (denoted as the source BO), for one node, downward until an external link to another Business Object is found (denoted as the Target BO), then the search start upward on the new Target Business Object until its Root node is reached. Then the Association is created between the two Business Objects. In these examples, the process is reiterated on all nodes and all level of the source Business Object and this for all the Incident Business Objects. Once all relationships have been established, the PIM XML file is generated, by specifying the available Business Objects and the existing relationships between them. The Maestro Tool or other appropriate tool may extract, and, based on this, file the Corresponding Process Components and Development Units and display the relationships between the Business Objects.

The incident model 200 may be presented in other forms, such as the tree model 124, which may be a suitable solution when the incident relates to many entities. For example, rules and methods may be implemented for the incident model 200 having known entities. For example, rules may be defined to define which entities of the net that the hierarchy display should start with, how to group and filter them, how to determine the child node(s), and other relevant rules for constructing the tree(s).

The tree model 124 allows users to define rules as to how to project the incident model 200 into a tree/hierarchy, without need to implement specific coding. Different alternatives may thus be defined by any/every end-user, thereby increasing efficiency in analyzing net-like information in a hierarchy. Thus, by providing the contextual information in a comprehensive hierarchical format, the support user may quickly localize potential sources for the incident and thereafter determine a corresponding solution(s).

As referenced above, the solution search engine 110 may provide a framework for a harmonized search on different information sources (sometimes called 'solution search sources' or 'solution sources' in the following) based on a specific object that provides contextual information, e.g., for an incident. Specifically, the search middleware 128 may be configured to provide a central middleware for solution search. The search middleware 128 may be used to integrate the search API(s) from different knowledge repositories of different solution search sources.

The search middleware 128 may be used by several consumer UIs 126, i.e., search clients. For example, the consumer search UI 126 may represent a search UI implemented as a 'wizard' for a user to attempt to self-diagnose a solution to an existing incident. The consumer search UI 126 also may represent a search interface used by a key user (support personnel) of an enterprise executing the application(s) 104, or may represent a consumer search UI of a vendor of the application 104. Particularly in the latter regard, it will be appreciated that the term 'consumer' in this regard refers to the application 126 as a client or other UI which is used to access (i.e., consume) stored solution-relevant information, and does not necessarily refer to a consumer in the sense of a purchaser of the application(s) 104.

The search middleware 128 may provide a number of features and advantages. For example, the search middleware 128 may effectively provide a single solution source for the various types of consumer search UIs 126 referenced above, even when the sources (e.g., sources 112a, 112b, 112c, or other solution sources discussed with respect to FIG. 3 or otherwise within the following description) ultimately searched by the search middleware 128 vary in terms of, e.g., platform(s), search technology, owner, solution type, or other characteristic.

More particularly, the search middleware 128 may include a search source manager 130 that may be configured to determine which of the available solution search sources should be involved in a given solution search, as well as which type of corresponding technology should be used for each selected solution source. For example, different users of the solution search 110 may have different levels of access to the various solution search sources (e.g., databases or repositories). In other examples, different types of software incidents may be associated with particular solution search sources. Other criteria may be used to determine search targets to be used for a given received incident and associated incident model generator 118. Thus, the search source manager 130 may be configured to determine which of these search sources (e.g., solution repositories) should or must be searched to provide a potential solution to the current incident.

An attribute manager 132 may be configured to enhance performance characteristics of the search middleware 128, by providing for searching of documents within the various solution sources (e.g., repositories) based on indexed attributes and associated values that are assigned commonly and/or in harmonization with one another across the plurality of solution sources. That is, for example, the attribute manager 132 may ensure that search terms and other characteristics may be searched commonly across a plurality of solution repositories, even when the terms/characteristics are not used commonly within or among the solution repositories. The attribute manager 132 also may be part of the application 104, which can furthermore contain a Consumer Search UI 126 (e.g. incident wizard or key user search) to provide value help on the customer end.

For example, each of a first and a second solution repository, e.g., within the business backbone 112, may contain a document with a possible solution to a received incident. The incident may include a search term expressed as an abbreviation in a first language, while the first solution repository contains a solution document including the abbreviation in a second language, and the second solution repository contains another solution document including a non-abbreviated version of the search term in the first language. The attribute manager 132 allows the search middleware 128 to return both of the two solution documents in this example by ensuring common use and mapping of attributes and their potential values across the plurality of solution repositories. Further, by providing for indexing of the various attributes, the attribute manager 132 provides for increased performance efficiency and speed of the search process, since a full free text search of all the documents in all of the solution repositories is not necessary.

A search dispatcher 134 is then responsible for transmitting the search request to the appropriate solution repositories, expressed using the commonly-assigned and indexed attributes, and using the appropriate technology. Examples of operations of the search dispatcher 134 are provided in detail below, e.g., with respect to FIGS. 3 and 4.

A rating manager 136 may be used to allow users or automated means to assign a rating to retrieved solution documents. As with the attribute manager 132, the rating manager 136 may harmonize such ratings across the different solution sources/repositories. For example, documents stored in the different solution repositories may have internal rating schemes that differ from one another, and the rating manager 136 may map or translate between these different rating schemes to provide a common rating. More generally, by being positioned within the search middleware 128, the rating manager 136 may receive ratings from many different users and a number of different consumer search UIs, for documents that are stored across the plurality of possible solution repositories, and may maintain these ratings for future evaluation by subsequent users who receive solution documents as part of a future solution search.

A search results compiler 138 may be configured to receive all searched-for solution documents from the various solution repositories, consult the rating manager 136 to associate rating information therewith as just described, and then provide the compiled results (solution documents), or a subset thereof, to the requesting consumer UI 126. The search results compiler 138 may include an identification of which of the plurality of solution repositories was the source of a particular solution document, and may provide other information, such as, e.g., a correlation score between each returned solution document and the original search. The search results aggregator 138 may provide the compiled search results using an appropriate search UI.

Figure 3:
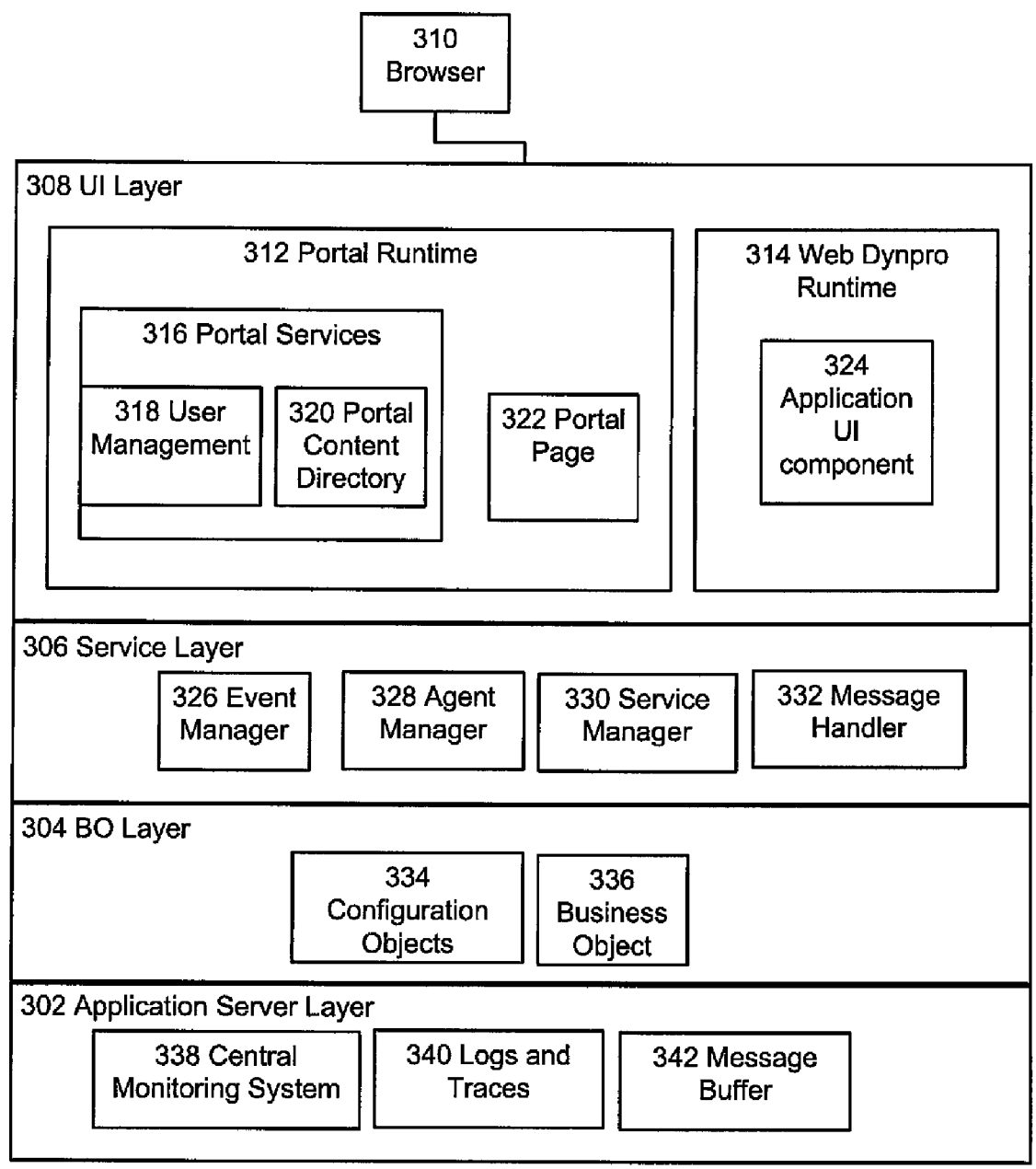
FIG. 3 is a block diagram of an example multi-layer architecture associated with a software application of FIG. 1.

FIG. 3 is a block diagram of an example multi-layer architecture associated with a software application of FIG. 1. In the example of FIG. 3, a support user may utilize a browser 310 to render one or more documents and other applications associated with an enterprise computing system. As indicated above, in connection with supporting errors and other issues associated with the enterprise computing system, context data may be obtained whenever a support request is initiated.

The context data as used herein may include relevant system and business information from one or more architectural layers: Application server layer 302, business object (BO) layer 304, Service layer 306, and UI layer 308. The gathered information may support at least one of one of the following use cases: solution search (known error identification/assignment) and wizard's execution (analysis wizards), or inspection (error cause identification), possibly including the ability to simulate error situations.

Relevant information may be defined on a layer-by-layer basis and can generally relate to (a) generic data provided by the infrastructure (e.g. statistical records) or a message log; or (b) components specific data defined by each component individually with respect to understanding an error situation and performing error cause identification and resolution thereto (this component specific data is especially relevant for the BO Layer 304).

The UI Layer 308 may include a Portal Runtime 312 (in which various portal services 316 such as user management 318, portal content directory 320, and object link service (not shown) may reside) and a Web Dynpro runtime 314, having, e.g., an application UI component 324 connected to a portal page 322 of the portal runtime 312, as shown. The UI layer of applications may implemented, for example, using Java. Relevant context data obtained from this layer may include, for example, user data, work center and role definition as well as displayed fields with input data/content.

The UI Layer 308 may obtain data such as a user ID of the end user (e.g., the person creating the incident message). A session ID may also be obtained to determine the session from which the support request has been initiated; a Web Dynpro pattern and floor plan from which the call has been sent. Additionally, a portal role to which the end user has been assigned may be obtained. This role may be pertinent to the authorizations, worksets the user can see, and the layout of the pages in the portal.

The UI Layer 308 may also obtain information characterizing a work set the end user is currently working in to enable an identification of a screen which is being presented to the end user when initiating the incident message. Some worksets may additionally comprise notes which may be obtained and form part of the context data.

Additional information that may be obtained by the UI Layer 308 include, for example, a locale parameter characterizing the browser utilized by the end user, the language the user is logged on, local time, and the like; an application ID of the application UI component(s) that are visible as part of the work set. Furthermore, the context data from the UI layer 308 may provide an intelligent screenshot that contains data that was presented to the end user at the time the incident message was initiated.

The services layer 306 may include an event manager 326, an agent manager 328, a service manager 330 and additionally a message handler 332, where internal and external error messages from the application are stored for a certain session. The services layer 306 may also optionally include a central extensibility repository (not shown). Relevant context data obtained from the services layer 306 may includes, for example, registered/called services or process steps in the BO Layer 304.

In the services layer 306, metadata of Business Objects is stored (in terms of process flow, called service, etc.). Therefore the services layer 306 may deliver all generic (as opposed to application component specific) information. This generic information may include all registered services that are called throughout the session by help of the service manager 330. Thereby the service manager 330 collects information about registered services or buffer data from services layer 306 as well as all ESI framework information, that is retrieved by the service manager 330 itself. Other context data that may be obtained from the services layer 306 includes traces of data flow for the service interface, and data characterizing transient messages in the message handler 332.

The BO Layer 304 is the software layer in which the business objects 336 (and additionally configuration objects 334) are implemented, using, for example, ABAP coding. Relevant context data obtained from the BO Layer 406 include, for example, configuration data or transaction data.

In further examples, context data derived from the BO Layer 304 may include called business object(s) which are clearly identified by business object type (e.g., PurchaseOrder) and business object ID. Additional, characteristics of business objects, such as respective configuration data, may be obtained for the context data. Other characteristics may relate to how a particular business object may be and is used. For example, in the area of "determination", a list of potential determinations in the system, which of these determinations have been activated and how they have been or will be used may also be utilized.

Information regarding available extensions (e.g., including their configurations) may also be obtained from the BO Layer 304; as well as information relating to a system expectation regarding a field value. For example, the system knowing what type of data it expects, therefore can determine valid values that can be entered into a field. Thus, the system may be able to assess whether or not the entered field value is a valid one or not and should display this accordingly.

Called methods and performed action information may be used to generate the context data. In the BO layer 304, in some variations, only the actual used implemented method of core service operations and the actual performed action is needed. The context data may also comprise data characterizing a trace, recording the actual performed "action" from the beginning of the session upon the time the error occurs is relevant.

Moreover, the context data obtained from the BO layer 304 may include information relating to an affected business object including information about all its business objects nodes (e.g., all elements of such business object which points to a node in the associated data model). With this information, each node can be identified by a key and contains a fix amount of attributes. In addition, information about the associations of the business objects (e.g., directed relationships between business object nodes). Services for navigation on top of the nodes are assigned to the association (which may be a composition or an aggregation association).

Context data may also include BO data as of the time the error/incident occurred. Checkpoint data at critical places in program coding can be used to provide context data that characterizes an internal status of the program (and which may, for example, be written to a log). Rules may be predefined which determine when to classify a situation as critical and what related data to populate in the log.

The Application Server layer 302 refers to the technical layers of the infrastructure, such as the SAP Web Application Server, J2EE engine, TREX, LiveCache, Portal Infrastructure, BI, XI, JTS, Database Interface, and the like. The Application Server layer 302 may comprise a central monitoring system 338 for monitoring various operating parameters of applications and for storing such parameters as statistical records. Moreover, the Application Server layer 302 may include a message log 340 that records messages relating to business object 336 and message buffer 342. Relevant context data from the Application Server layer 302 may include, for example, statistical records or system information such as software release and patch level.

The Application Server layer 302 may provide a transaction ID of the entire transaction throughout the solution (i.e., through all of the technology stacks) so that statistical records may be generated. The statistical records may characterize remote function calls to other components; database accesses; CPU usage; memory usage; data transfer to and from relevant database(s), database response time, and the like. The context data may also utilize information regarding the agents called from the beginning of a session upon the time the error occurs and the "runtime" of each of these agents (which may be provided by a trace).

Figure 4:
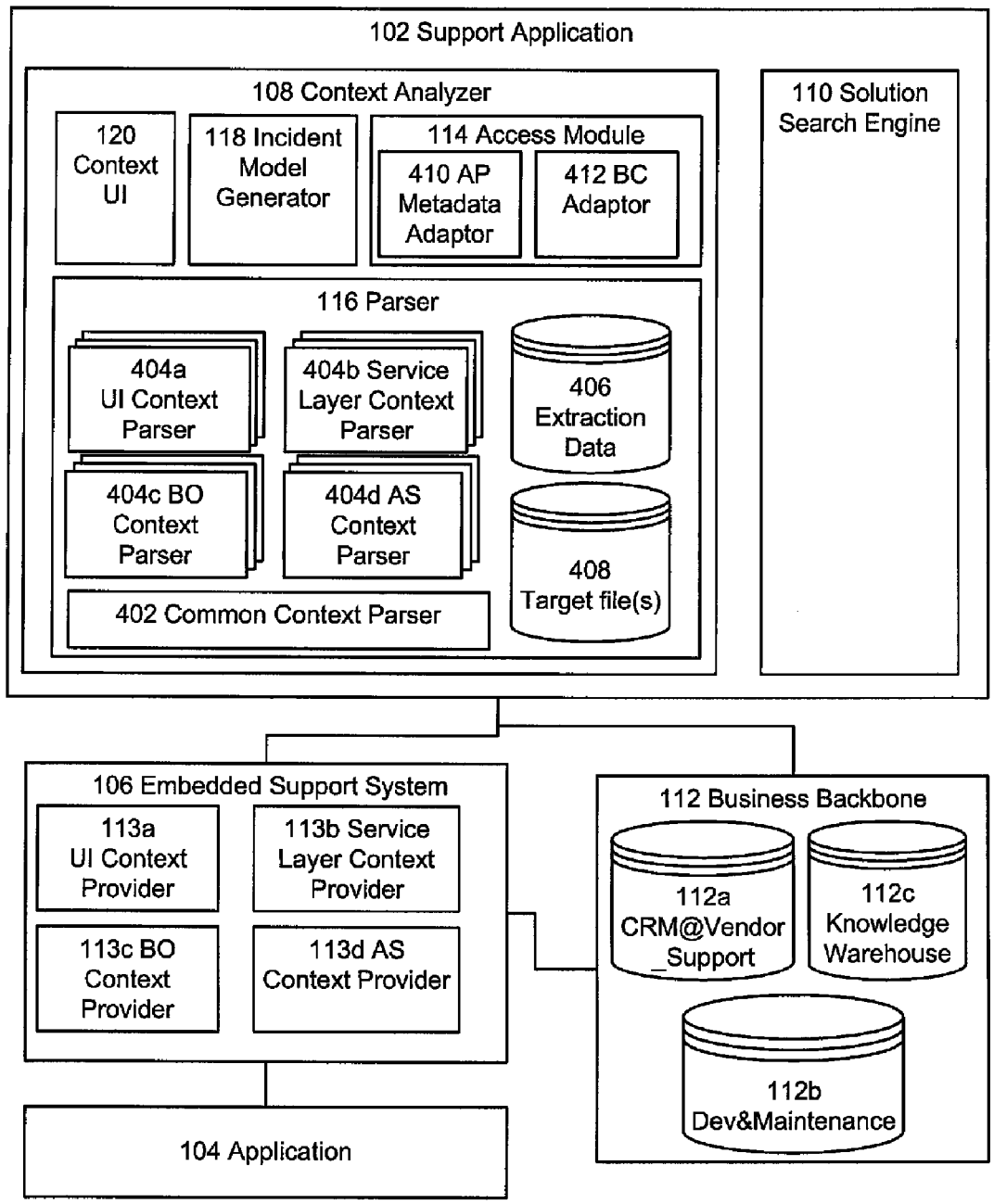
FIG. 4 is a block diagram illustrating multilayer context parsing and incident construction using an example implementation of the system of FIG. 1.
Figure 11:
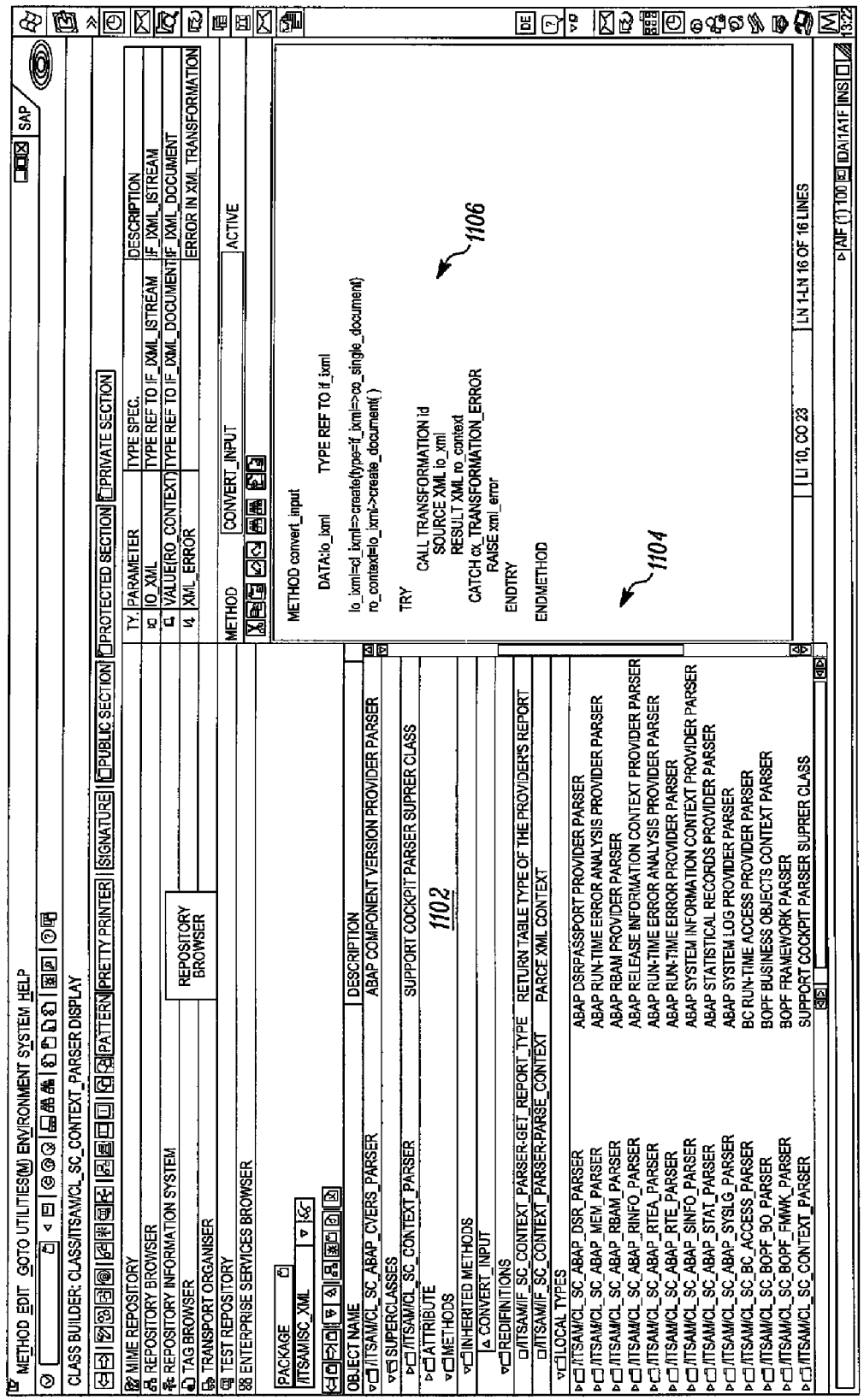
FIG. 11 is an example screenshot of example context parsers that might be used to implement the system of FIG. 4

FIG. 4 is a block diagram illustrating multilayer context parsing and incident construction using an example implementation of the system of FIG. 1. In FIG. 4, a common context parser 402 is illustrated which performs a common parsing of all incoming incident messages (context information). As described herein, such context information may be included as an XML file attached to an incident. The common context parser 402 may thus perform a transformation of the XML file to a data format that is specific to the server running the support application 102, such as an ABAP or Java server specific format. This transformation, common to all context parsers 404a-404d, may thus be implemented by a super class (as shown in FIG. 11).

Afterwards, the context parsers 404a-404d may be used in a desired or appropriate order. In FIG. 4, each of the context parsers 404a-404d represent a single context parser at a particular layer of the multi-layered architecture such as that of FIG. 3. For example, the context parser 404a may represent a UI context parser that corresponds to a specific context provider, shown as UI context provider 113a in FIG. 4. As illustrated in FIG. 4, the UI context parser 404a may represent a plurality of context parsers at the UI layer 308 of FIG. 3. For example, a total of 10-15 or more UI context parsers may be included, each corresponding to different UI context providers, such as the UI context provider 113a. For example, different UI context parsers may exist for different elements or attributes at the UI layer 302, or may exist for different vendors or sub-vendors providing part of the relevant UI(s).

In this way, the context parser 116 and/or the incident model generator 118 may select the appropriate/necessary context parsers to perform a particular parsing operation(s). For example, the software application 104 of FIG. 1 may be associated with a particular vendor, supplier, or other personnel, and may have particular version information or other distinguishing characteristics. Appropriate context provider(s) may be included with embedded support application 106 to collect corresponding context information. For example, the relevant vendor or supplier may provide a context provider for this purpose, or the context provider(s) may be implemented independently. Meanwhile, a separate software application (not shown in FIG. 1) may have different characteristics associated with different context providers at the UI layer 302. Moreover, even for the same software application, it may occur that a different set of context providers is used for a first incident as compared to a second, later incident.

Thus, the incident model generator 118 may initially determine (e.g., from the access module 114) which of all available/possible context providers are actually providing context information for a particular incident message that has been received. Then, the incident model generator 118 may select, from all the available UI context parsers of the context parser 116, appropriate one(s) for parsing context attached to the received incident message. Similar comments apply to each of the service layer context parser(s) 404b and corresponding context provider(s) 113b, the BO context parser 404c and corresponding context provider(s) 113c, and the application service layer context parser 404d and corresponding context provider(s) 113d.

By performing such context parsing on a layer-by-layer basis, the context parser 116 may leverage parsing performed at lower layers to better perform parsing or other use of data associated with higher layers. For example, the BO context parser 404c may collect and parser BO information (e.g., identifiers) for all involved business objects. Then, the service layer context parser 404b may use this information to access corresponding data or metadata, e.g., from the business backbone 112. In this way, the best and the most necessary/relevant information may be collected, in a manner that is fast and efficient.

As described above, the access module 114 may be responsible for accessing such metadata. For example, as shown, the access module 114 may include or access an application platform metadata adaptor which may be used to complete or enrich the incident model, e.g., by reading the relevant models, entities and their attributes. These may come from, for example, a database for specification models and entities attributes, an XI Design time system, such as ESR (Enterprise Service Repository), or an ABAP Runtime implementation system such as ESF (Enterprise Service Framework).

Included information may include associations between incident objects not available in the various context providers, but however potentially of interest for incident context analysis, as well as associated metadata information. This information may be available via APIs and may carry its own version on which a customer might be running. For each software component version for which information is requested for context analysis, an instance of the metadata adapter interface may be responsible for determining the correct system(s) address to call remotely, using an appropriate directory.

The access module 114 also may include or access a business configuration adaptor which may be used to access customer specific configuration data, e.g., from a central Design Time system. Customer configuration maintenance and content author activities may be performed centrally for the entire system landscape in a design time system. For example, the customer may decide about an implementation in a scoping process in a particular business language and may have only a residual amount of configuration work left done on simplified schemas of configuration tables. Also all specific category and code lists that need to be shown in the context analysis may be implemented in the form of configuration tables in a runtime system. Various APIs may be available to access all business configuration-related information. Depending on the customer, an instance of the business configuration adapter interface may handle the access to the central (business configuration) design time system, addressing the correct system address and customer workspace.

In performing the actual parsing, each context parser(s) 404a-404d may have access to suitable extraction data 406, which may include rules or other information for use in transforming, translating, modifying, or otherwise obtaining information from a received incident message. Although shown as a single memory in FIG. 4, it may be appreciated that each context parser(s) 404a-404d may be associated with its own individual extraction data useful for corresponding context parsing.

For example, at the UI layer, a first corresponding context provider associated with a first platform and/or provider may provide context information in a first sequence, using a particular nomenclature for XML tags, and including (or not including) certain types of information/data/metadata. Upon determining that such a context provider has provided context information, the UI context parsers 404a may consult the extraction data 406 to determine rules for parsing such context information (e.g., whether and how to rearrange XML tags, whether and how to translate certain terms, and whether and to what extent to consult external sources to obtain necessary data/metadata).

Then, each context parser 404a-404d may output its resulting parsed context information to a separate context parser for further parsing, and/or to a target file(s) 408. For example, the parsed context information may be stored in a table(s) within the target file(s) memory 408.

Figure 5:
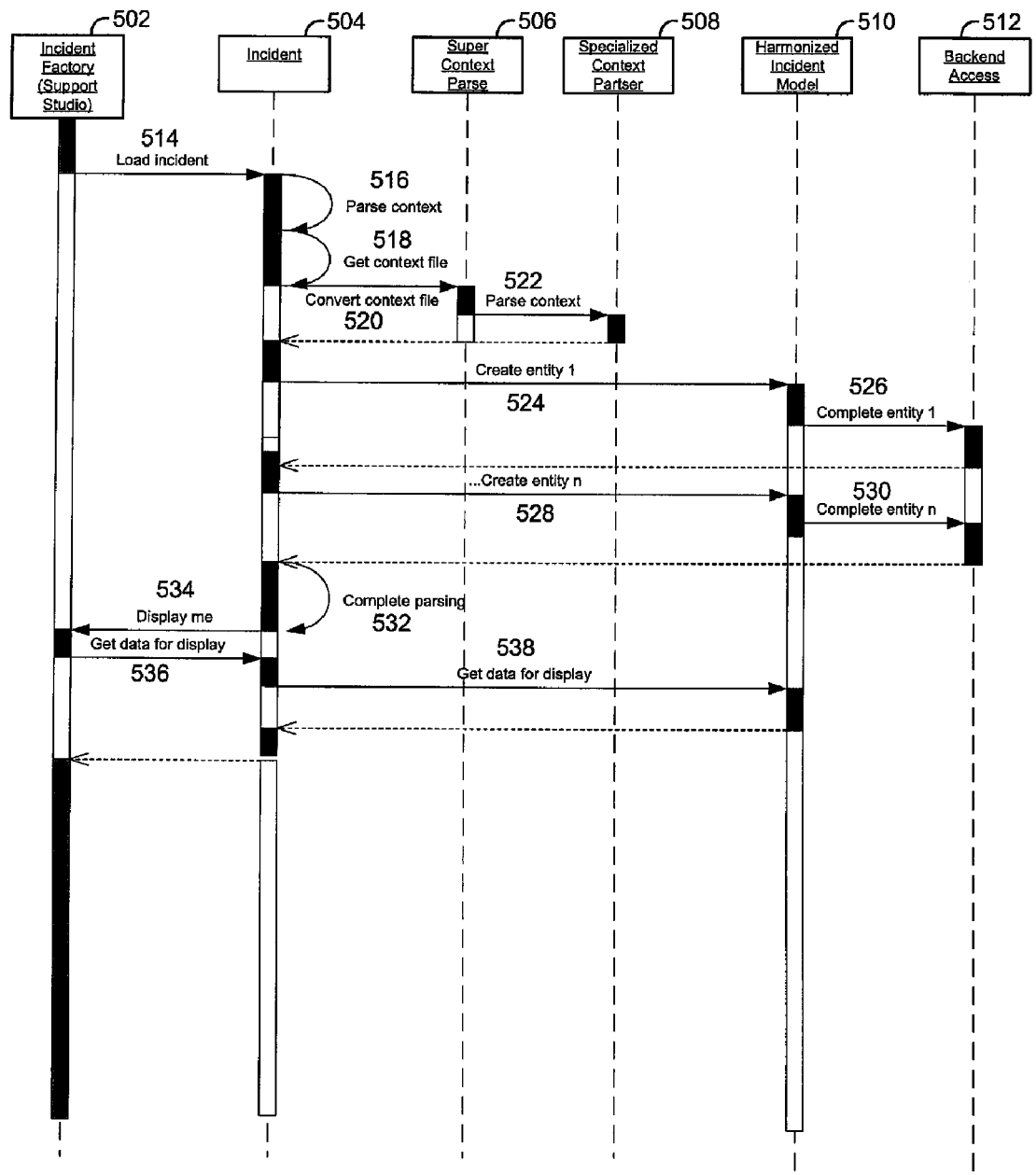
FIG. 5 is a timing diagram illustrating an example sequence of operations for implementing the system of FIG. 4.

FIG. 5 is a timing diagram illustrating an example sequence of operations for implementing the system of FIG. 4. As shown, the relevant entities may include an incident factory 502 such as shown in FIG. 2, an incident (message) 504, a super context parser 506 such as the common context parser 402 of FIG. 4, a specialized context parser 508 such as the context parsers 404a-404d of FIG. 4, a harmonized incident model 510 such as the incident model 202 of FIG. 2, and backend access 512 such as access to business backbone 112 of FIGS. 1 and 4.

In operation, then, an incident is loaded from the incident factory (514) associated with the support application 102 (also referred to herein as the support studio). The incident 504 is initially parsed (516), e.g., to identify associated context providers from the context file (518). Then the context file is converted (520) into a common format and the super context parser 506 performs (522) the common context parsing.

The specialized context parser(s) 508 may then parse the context file for use in creation (524) of a first entity, entity 1. For example, the specialized context parser(s) 508 may provide information for use by the incident model generator 118 to create a collected object that represents an entity associated with the software application 104, such as, for example, an entity such as a business object, a software engine instance, a work center, or other entity potentially associated with the software application 104 and its relevant incident(s) (additional examples of such entities are provided herein, e.g., with respect to FIGS. 2 and 6). The entity may then be added to the harmonized incident model 510, and potentially completed (526) by adding metadata by way of backend access.

The process continues with creating additional entities "n" (528) and completing these entities "n" (530), until parsing is completed (532). At this point, in order to display the harmonized, enhanced incident model (534), the incident model generator 118 may request incident and related data from the incident factory 502 (536), which may all then be provided for display. Thus, parsed data may be stored during run-time in the harmonized incident model 510, so that the support studio/application need only access the run-time model to display the harmonized incident model 510 in a hierarchy, graph, or detail pop-up.

Figure 6:
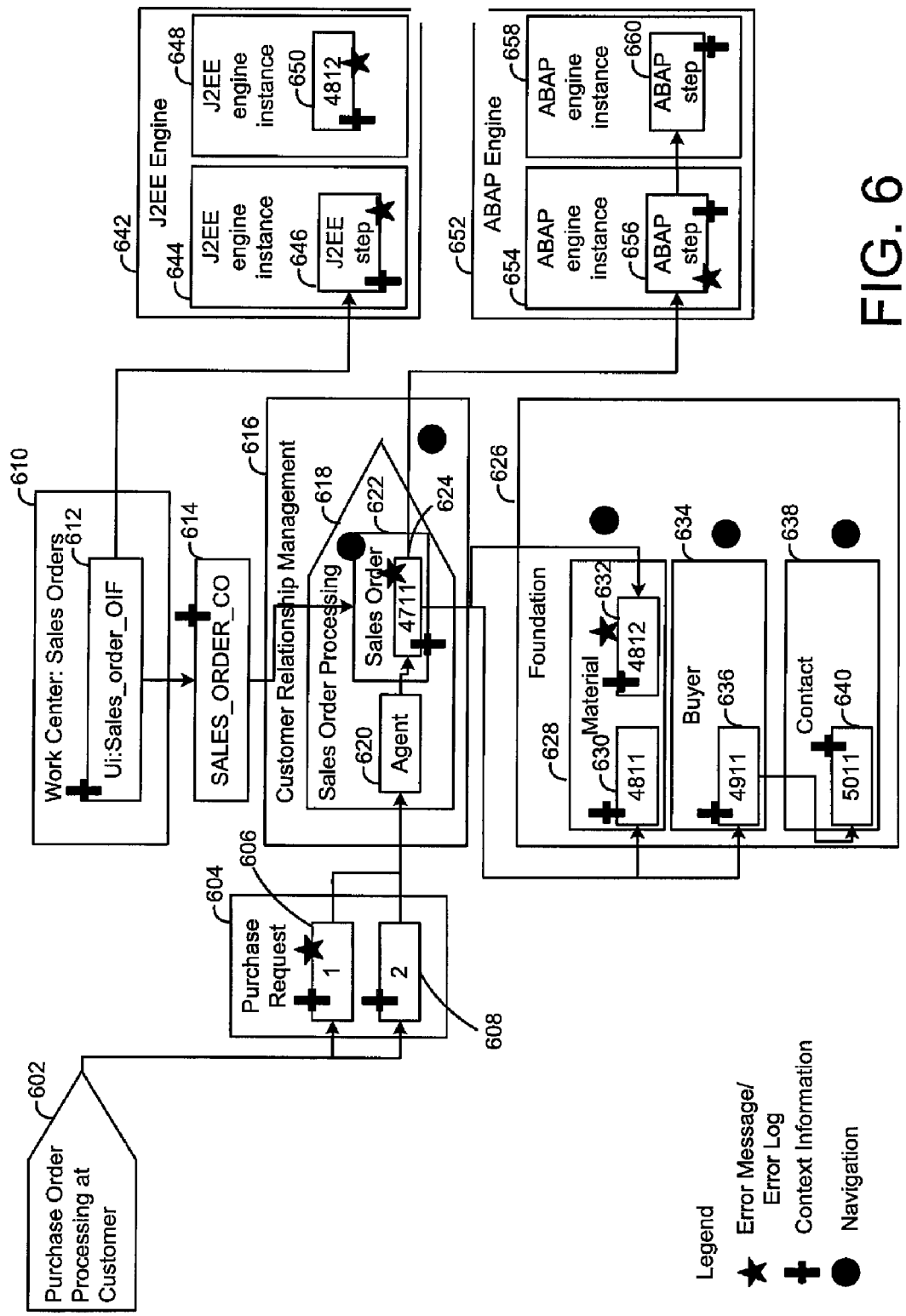
FIG. 6 is a block diagram of an example of an incident model constructed using the system of FIG. 4.

FIG. 6 is a block diagram of an example of an incident model constructed using the system of FIG. 4. In the example of FIG. 6, purchase order processing 602 occurs at the customer site and results in a purchase request 604 that includes a first purchase request 606 and a second purchase request 608, which are then forwarded to an agent 620 of a sales order processing entity 618 that is part of a larger application, e.g., of the Customer Relationship Management application 616. The agent 620 may then provide the incident message to an object class sales order 622 that (may) include(s) a sales order object 624.

The sales order 622 may receive additional metadata by way of a sales_order 614 that is in communication with a work center 610 and its associated UI (UI Sales-order-OIF) 612 (614). Also, data or metadata about the sales order instances 624 may be obtained using foundation code 626 that includes material 628 (including materials 630, 632 related to the purchase order in question), and a buyer 634 (including a person or other more specific buyer 636) associated with contact information 638 including specific contact and related information 640 for the buyer 636.

Ultimately, the UI 614 may be provided using a J2EE engine 642, along with its J2EE engine instances 644, 648. Various steps 646, 650 are illustrated that may be performed by the engine instances 642e. Meanwhile, an ABAP engine 652 may be used to process the sales order 622 and thus may be represented as an entity in the incident model, as shown. Similarly to the J2EE engine, engine instances 644, 658 and associated steps 656, 660 may be used to ensure a desired presentation/illustration of the sales order objects 614.

It will be appreciated from the above description that the various entities/nodes of FIG. 6 correspond to the more generic example of FIG. 2, as constructed by the system(s) of FIGS. 1 and/or 4. For example, the sales order node 622 may correspond to a specific collected object, meaning, for example, that characteristics of the sales order node 622 may be 'collected' or drawn from portions of one or more context documents from one or more context providers, and created by one or more context parsers as described above with respect to FIG. 5, perhaps in conjunction with metadata drawn from, e.g., business backbone 112.

In FIG. 6, each such node may be marked with one or more icons according to the provided legend. For example, a star or other icon may indicate a presence of associated error information, while the cross icon may indicate the presence of associated context information, and the circle may indicate a navigable link to another collected object/node. Thus, for example, a support user may easily observer where context and/or error messages are available, and may select one or more of the icons as desired to view the corresponding information.

Thus, included with the nodes is information relating to the relevant entity. As described, within the example of FIG. 6, the information includes the item type or role, an entry indicating whether a technical or other error is associated with the item, and an entry indicating whether context data is available regarding the item. By selecting any of the nodes, detailed data may be populated in a preview window. In some instances, the data populated in the preview window may include error data relevant to the selected node, the context data of the selected node, or the node's various attributes.

Figure 7:
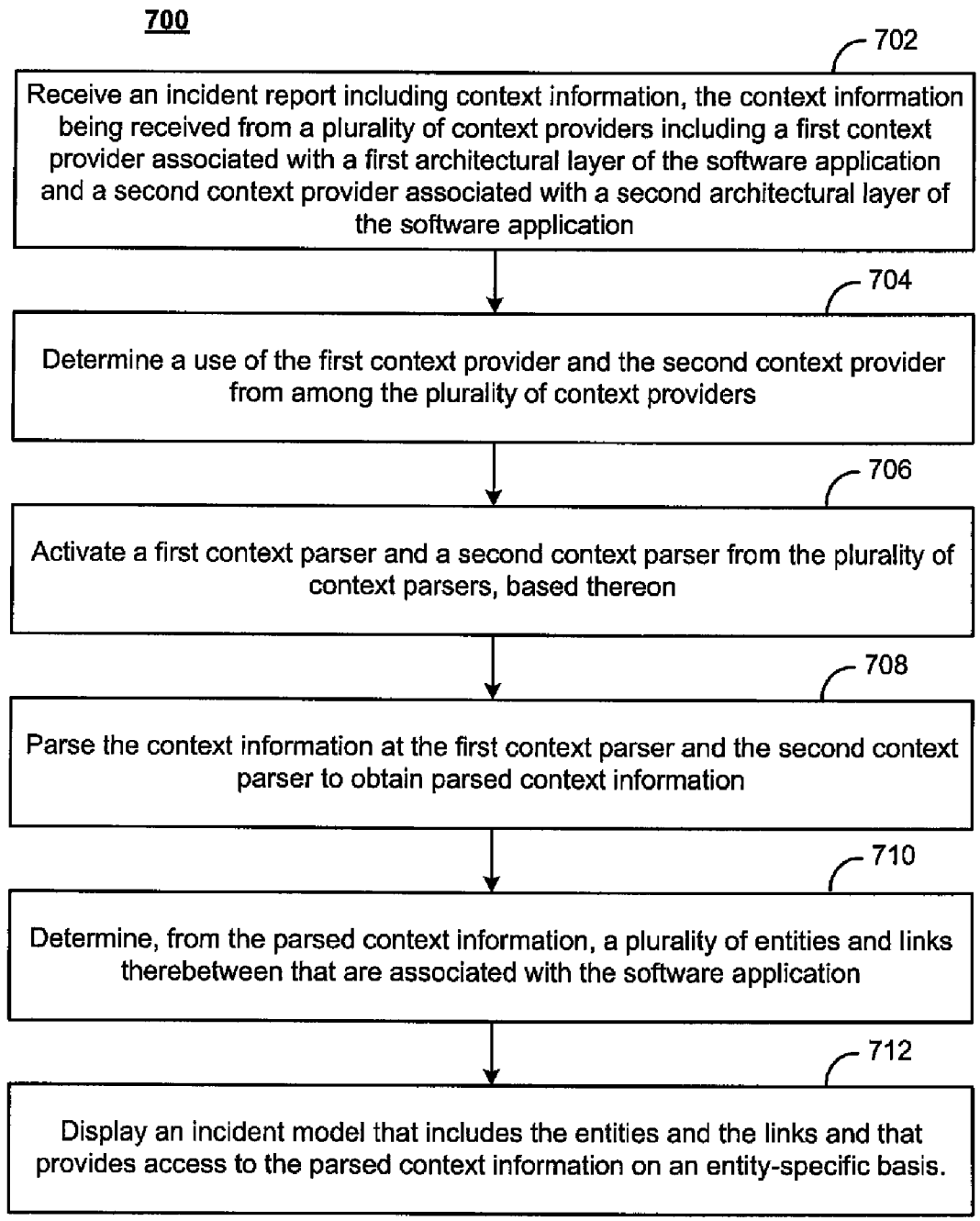
FIG. 7 is a flowchart illustrating example operations of the system of FIG. 4.

FIG. 7 is a flowchart 700 illustrating example operations of the system of FIG. 4. In FIG. 7, an incident report may be received (702) from a software support system associated with a software application associated with multiple architectural layers, the incident report associated with a software incident of the software application, and including context information associated with the software application at the time of the software incident. The context information may be received from a plurality of context providers including a first context provider associated with a first architectural layer of the software application and a second context provider associated with a second architectural layer of the software application.

Figure 8:
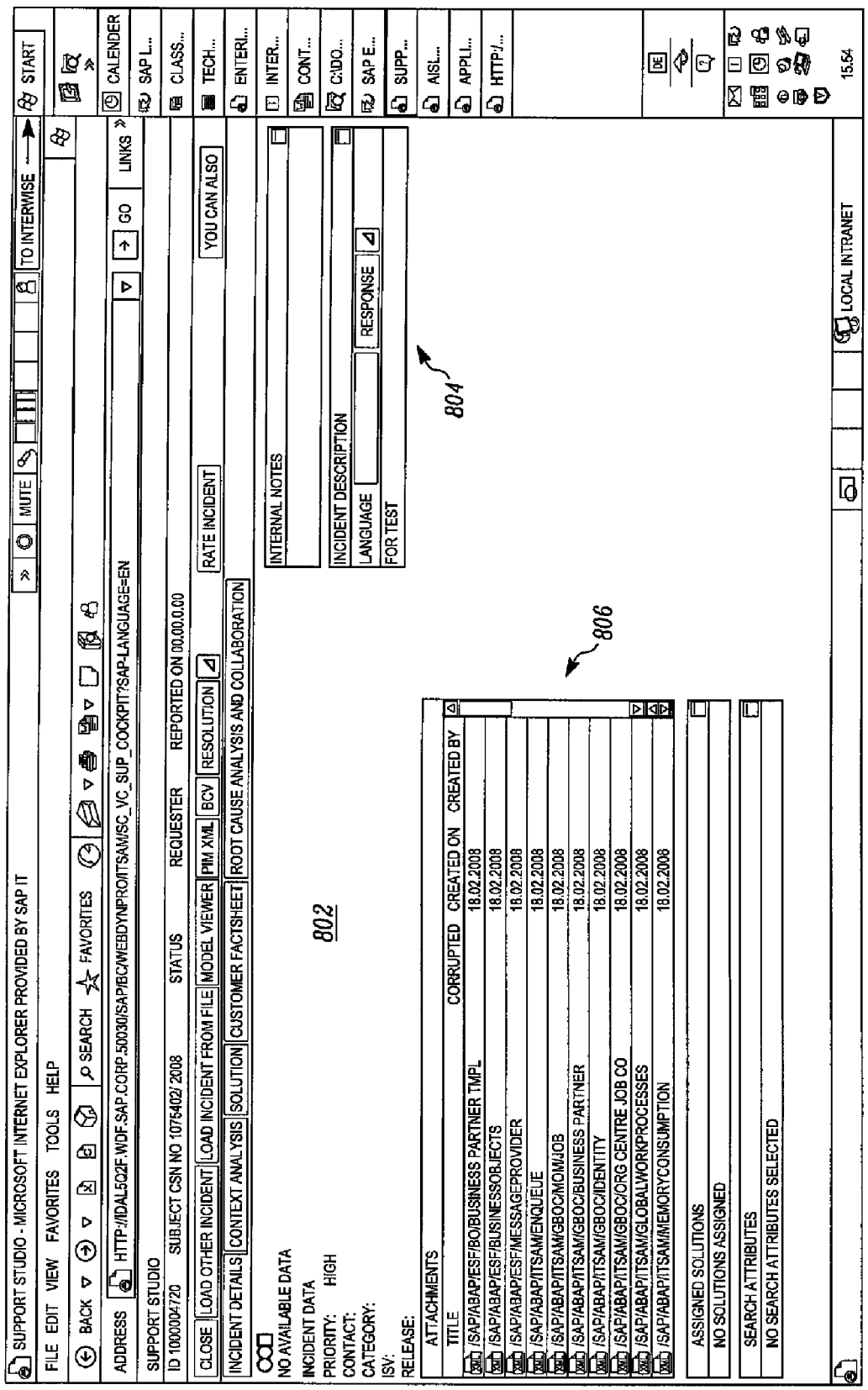
FIG. 8 is an example screenshot of an example list of context providers determined by the system of FIG. 4

For example, as described, such an incident report may be received from the embedded support system 106 of FIG. 1 for the software application 104, which may be associated with the multi-layer architecture of FIG. 3. First and second context providers associated with each layer, such as shown in FIG. 8, may provide the context information, as shown for example, in FIGS. 9 and 10.

A use of the first context provider and the second context provider from among the plurality of context providers may be determined (704). For example, the incident model generator 118 of FIGS. 1 and 4 may example a name(s) of relevant context providers, such as the list of context providers determined and shown in FIG. 8.

A first context parser and a second context parser from the plurality of context parsers may be activated, based thereon (706). For example, the incident model generator 118 may spawn instances of classes for performing the context parsing. As described with respect to FIG. 4, the first and second context parsers may each be associated with corresponding architectural layers, i.e., the same layer(s) as the first and second context providers, respectively. Examples of such context parsers are illustrated below in FIG. 11, along with a common or super context parser corresponding to the common context parser 402 of FIG. 4 which is configured to provide an initial and common conversion of received context information.

The context information may be parsed at the first context parser and the second context parser to obtain parsed context information (708). For example, the context parsers 404a-404d and/or the context parsers of FIG. 11 may be used to harmonize semantics (e.g., XML tags) or otherwise categorize and/or extract context information from the context information. The context parsers 404a-404d may operate in such a manner that a first context parser at a relatively low layer outputs first parsed context information that is then parsed by a context parser at a higher layer to obtain second parsed context information, so that the various context parsers may leverage their layered nature and the layered nature of the software application 104 itself.

Figure 9:
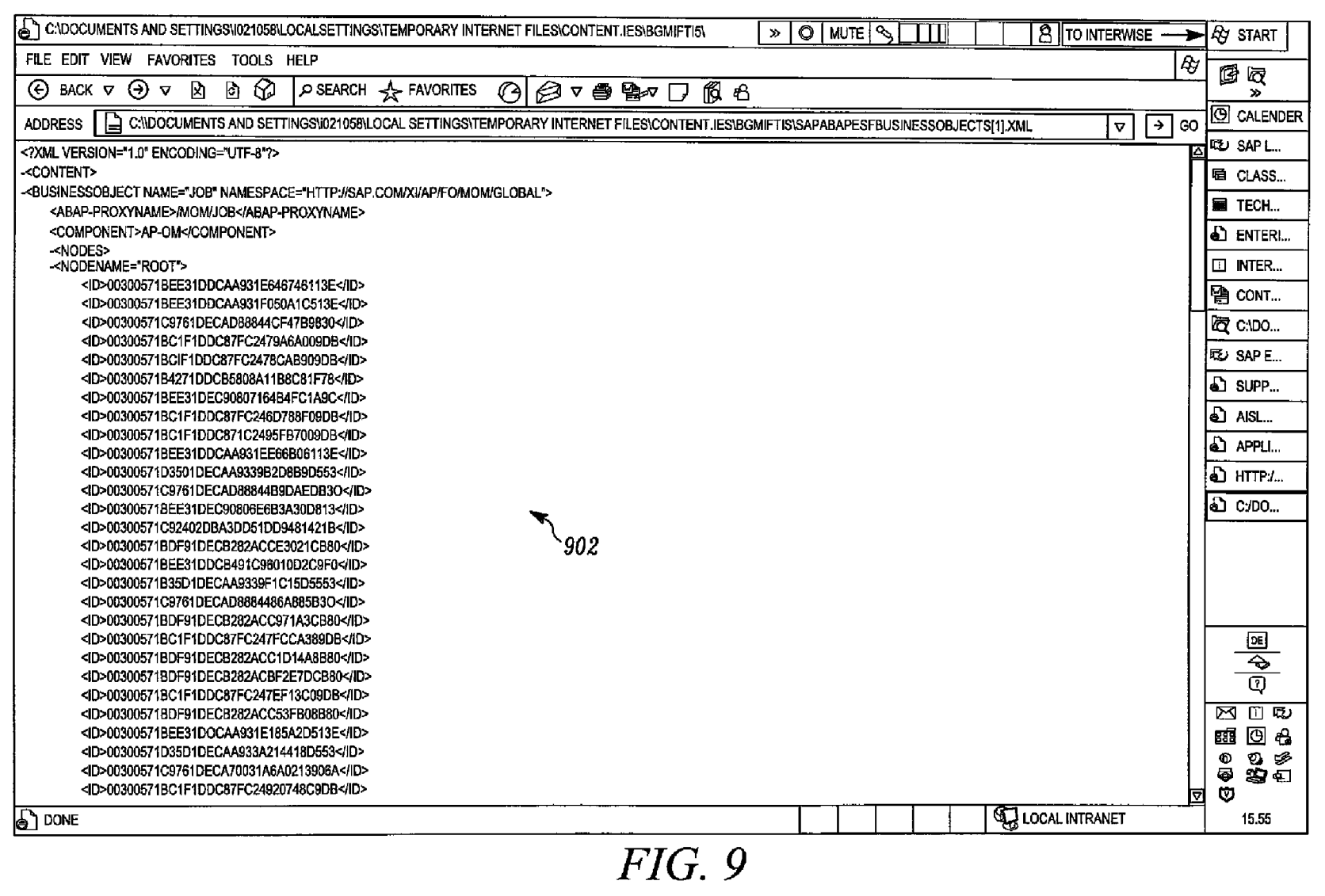

From the parsed context information, a plurality of entities and links therebetween that are associated with the software application may be determined (710). For example, if the context information includes a list of business objects potentially involved in the software incident, such as shown in FIG. 9, then the corresponding BO context parser (e.g., context parser 404b of FIG. 4) may determine from extraction data 406 and from error messages associated with the context information that some subset of the business objects are likely to be associated with the incident (and/or a resolution thereof). The incident model generator 118 may thus begin to construct, e.g., the incident model of FIGS. 2 and/or 6 in which entities or nodes related to the relevant business objects or other elements, as well as links/relationships therebetween, are shown.

In so doing, as described, back-end data (metadata) may be determined for, and associated with, the business objects or other entities. For example, where the software application 104 is constructed using an underlying software model, the access module 114 may access customer-specific information regarding the software model or configuration thereof, in order to supplement or interpret specific aspects, attributes, or values associated with the context information. When the software application 104 is not model-based, then similar metadata may be collected by the same or different context providers 113a-d as part of the context collection process, and then used similarly to the model-based metadata to utilize the (parsed) context information.

Finally, an incident model may be displayed that includes the entities and the links and that provides access to the parsed context information on an entity-specific basis (712). For example, the incident model generator 118 may provide the incident model(s) of FIGS. 2 and 6. As shown in FIG. 6, the various entities may include links with which a user may select and view relevant parsed context information. In this way, the user may more easily resolve the software incident and thus may facilitate use of, and satisfaction with, the software application 104.

FIG. 8 is an example screenshot of an example list of context providers determined by the system of FIG. 4. In sections 802 and 804, information about the overall incident may be provided, such as a category or priority of the incident, or a detailed description of the incident. In section 806, a list of determined context providers may be provided (e.g., a list of attachments, each including context information from an identified context provider).

FIG. 9 is an example screenshot of context information 902 collected by an example context provider of the system of FIG. 4 at an example architectural layer. Specifically, FIG. 9 relates to a provider at, e.g., the business object layer 304 of FIG. 3. As shown, identifiers of business objects are collected, in the example ID for a collected Business Object "Job" from the Deployment Unit "Master and Organization Data Management". That is, for example, this context information does not include context information that might be collected at, e.g., the application server 302, such as underlying hardware information, but rather focuses on information at its own architectural layer(s).

Figure 10:
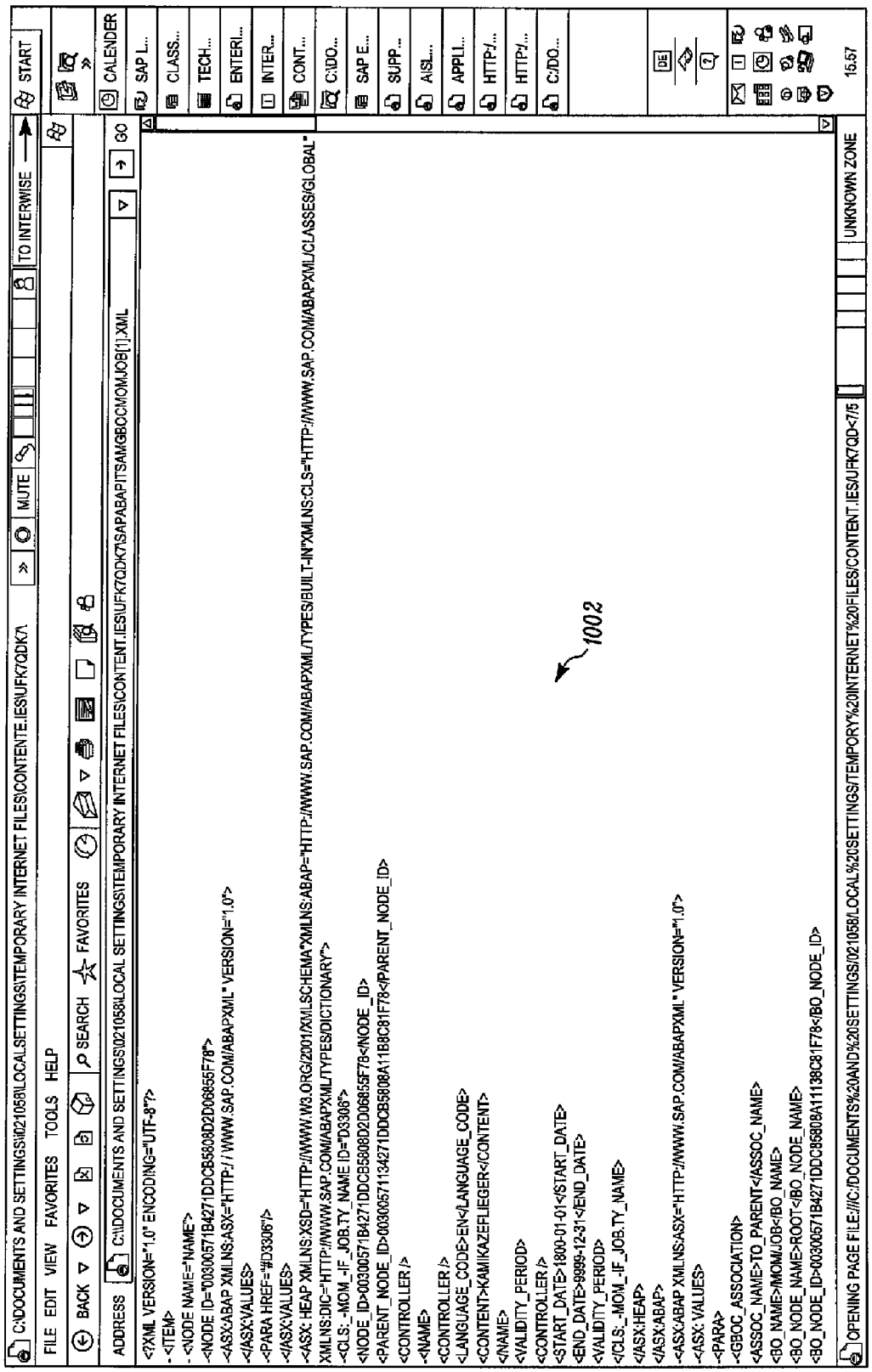
FIG. 10 is an example screenshot of context information collected by a second example context provider of the system of FIG. 4 at a second example architectural layer.

FIG. 10 is an example screenshot of context information 1002 collected by a second example context provider of the system of FIG. 4 at a second example architectural layer. Specifically, FIG. 10 provides relatively upper or higher level information, such as at the services layer 306, e.g. BO node and relations to other BOs, but only for one collected business objects already determined to be involved in, or related to, the incident in question. In this way, relatively upper or higher layers may effectively leverage information from relatively lower layers in order to process the context information more efficiently.

FIG. 11 is an example implementation screenshot of example context parsers that might be used to implement the system of FIG. 4. In FIG. 11, a section 1102 allows a user to select from among different context parsers, including the common or super context parser 402, which in the example of FIG. 11 has been selected and an example implementation is illustrated in section 1106. A section 1104 provides a listing of layer-specific context parsers that could also be selected for subsequent viewing in section 1106.

Figure 12:
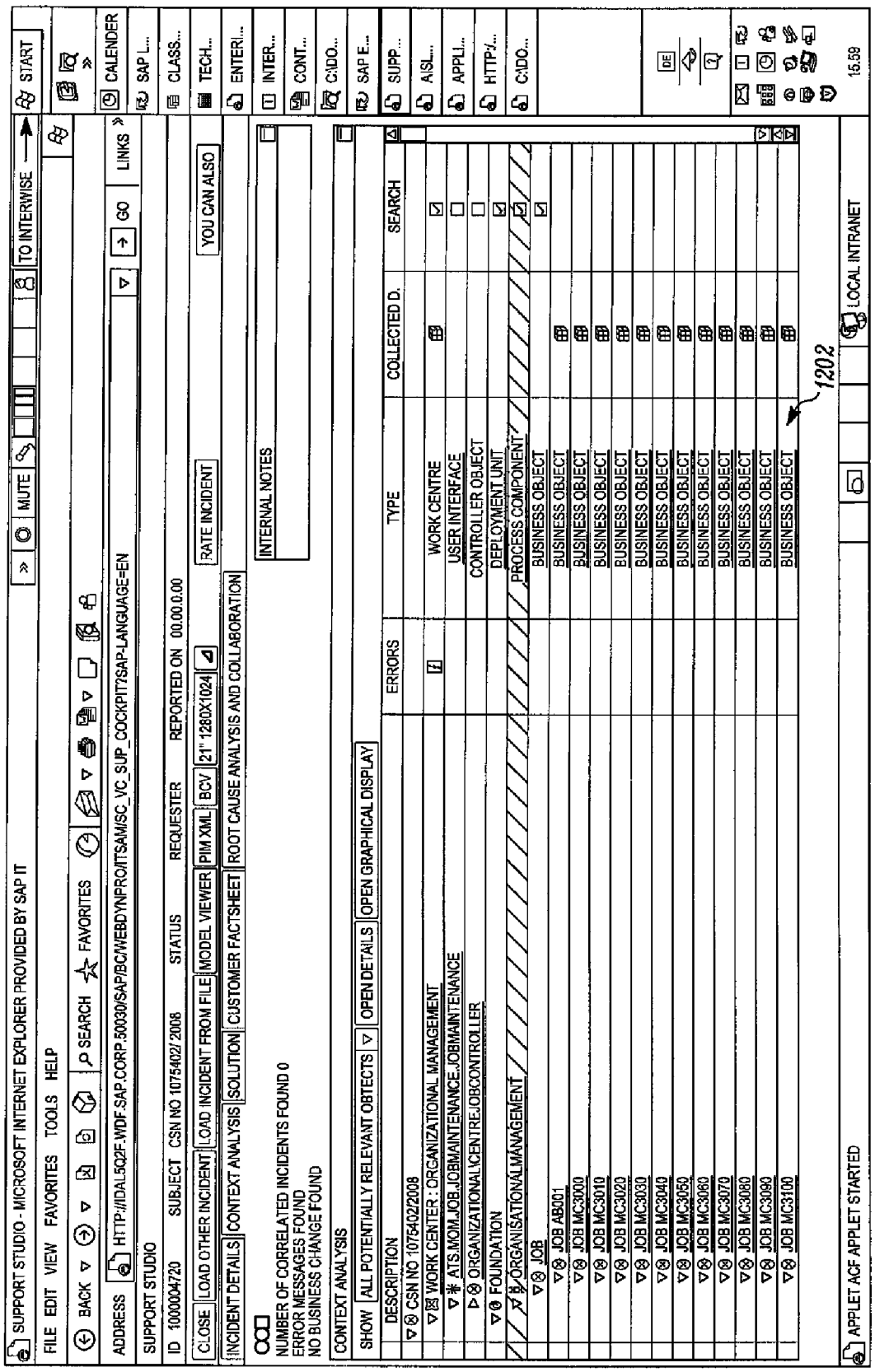
FIG. 12 is an example screenshot illustrating use of backend data to enhance collected and parsed context information.

FIG. 12 is an example screenshot illustrating use of back-end data to enhance collected and parsed context information. In particular, a section 1202 illustrates a description, associated error(s) if any, a type, and collected information (as a linked icon) for each, in this example, the affected work center with its UI component and business object controller and, further down, collected business objects under their process component and deployment unit. It will be appreciated that the business objects as presented here have now been associated with relevant back-end and/or customer specific metadata that is available for viewing in conjunction with the specific business object(s).

Figure 13:
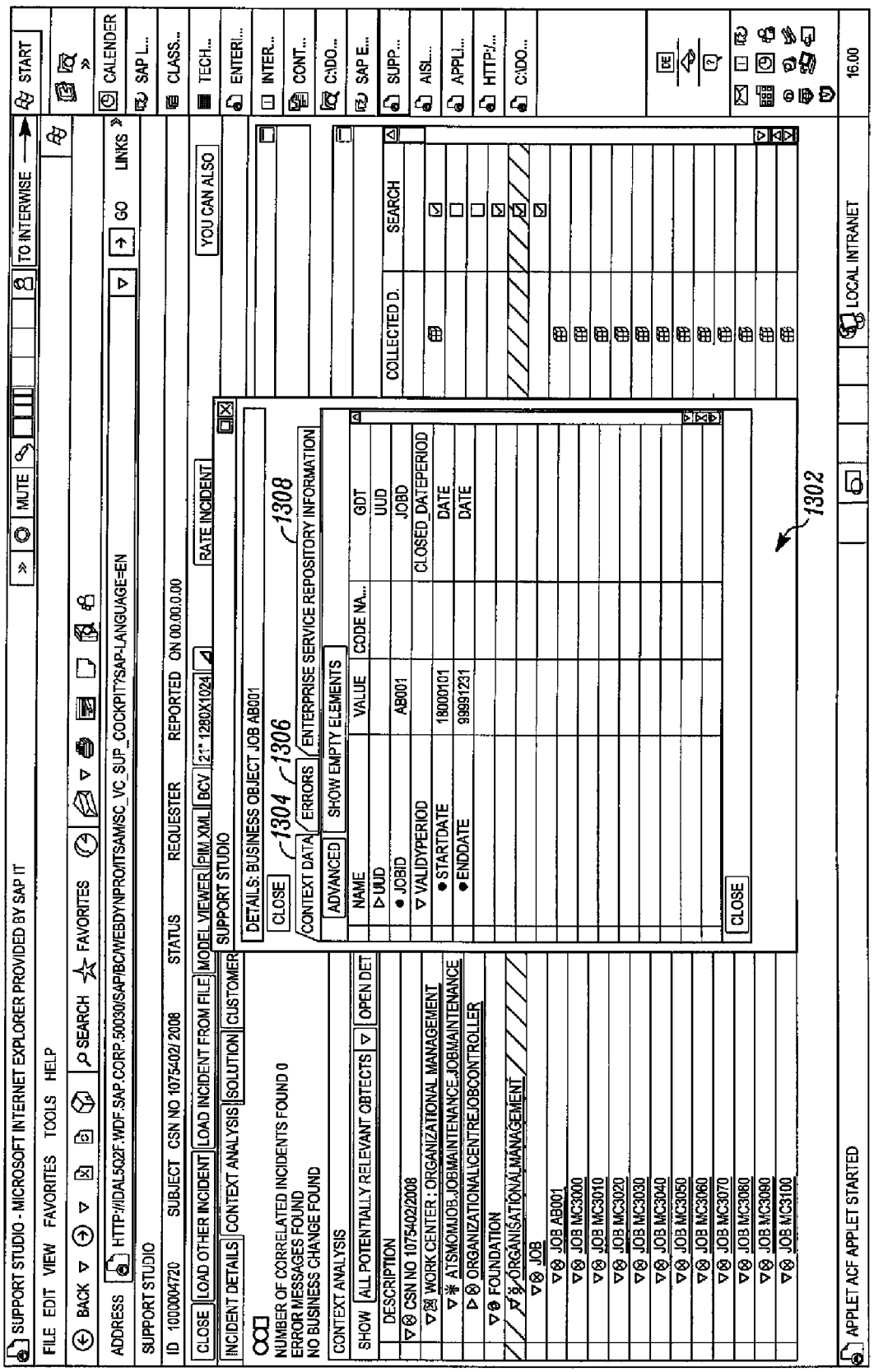
FIG. 13 is an example screenshot illustrating a first view of enhanced context information.
Figure 14:
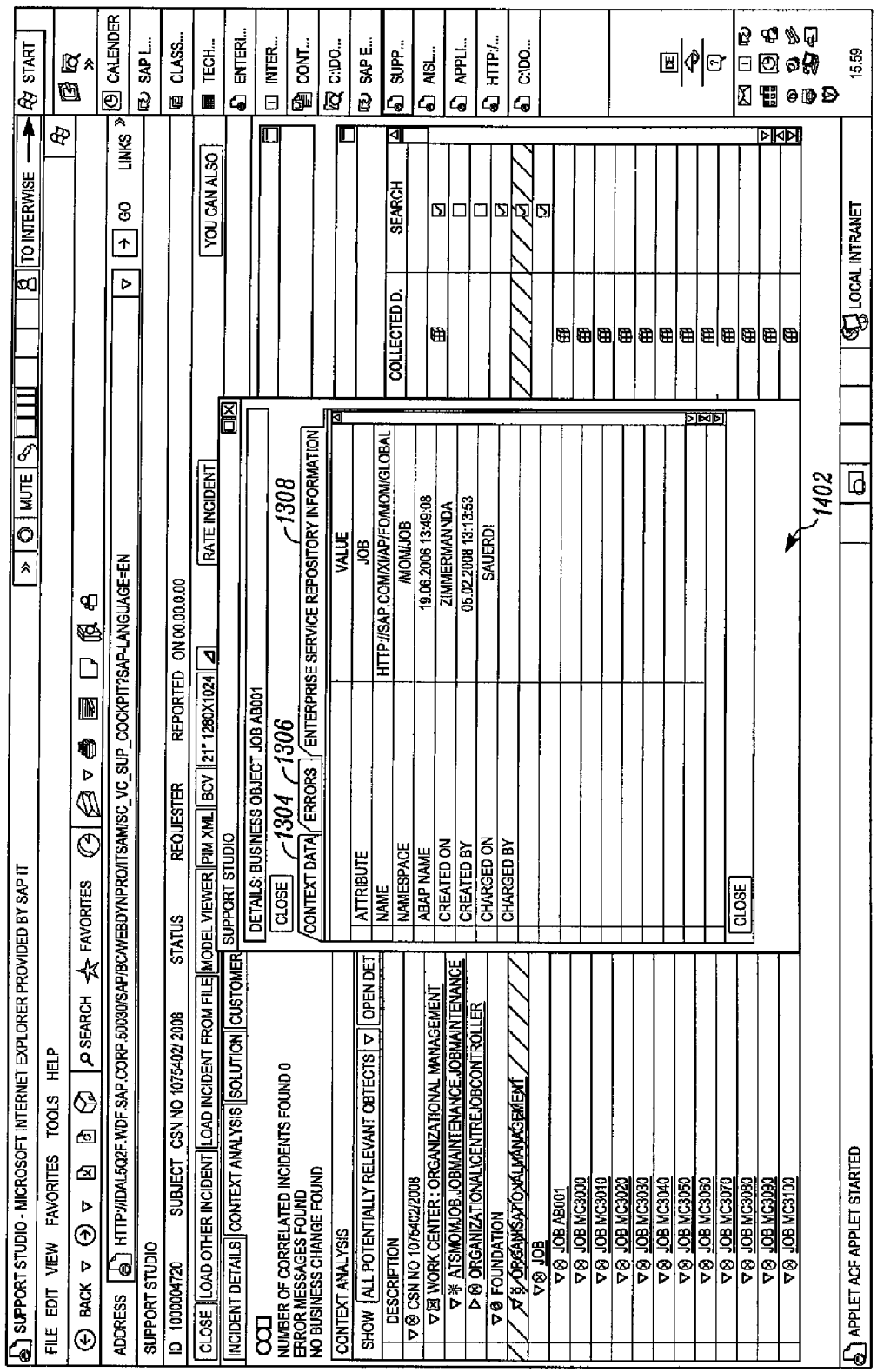
FIG. 14 is an example screenshot illustrating a second view of enhanced context information.

For example, as shown in FIG. 13, selecting one of the listed collected business objects may result in a pop-up screen 1302 related to the selected business object job (here, labeled "AB001"). Specifically, three tabs are illustrated including a tab 1304 for context data, a tab 1306 for error data, and a tab 1308 for enterprise service repository information (ESRI) as an example of such back-end data. In FIG. 13, the tab 1302 is selected and information is displayed regarding a job ID and relevant validity dates for the job in question. Meanwhile, in FIG. 14, the tab 1308 is selected to show a pop-up window 1402 in which a name, namespace, creation/modification date(s), and other information are illustrated.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions stored on a non-transitory computer-readable storage medium executable by at least one processor, the system comprising:
    a context analyzer configured to cause the at least one processor to receive, from a software support system associated with a software application associated with multiple architectural layers, an incident report associated with a software incident of the software application, the incident report including context information associated with the software application at the time of the software incident, the context information being received from a plurality of context providers including a first context provider associated with a first architectural layer of the software application and a second context provider associated with a second architectural layer of the software application, the context analyzer including
        a plurality of context parsers, each associated with a layer of the multiple architectural layers of the software application, and each configured to parse context information from a corresponding one of the plurality of context providers;
        an incident model generator configured to determine a use of the first context provider and the second context provider from among the plurality of context providers, and configured to activate a first context parser and a second context parser from the plurality of context parsers, based thereon,
        wherein the incident model generator is further configured to determine, from parsed context information output by the first context parser and the second context parser, a plurality of entities and links therebetween associated with the software application, and configured to display an incident model that includes the entities and the links and that provides access to the parsed context information on an entity-specific basis, the parsed context information including first parsed context information from the first context parser and second parsed context information from the second context parser, the second context parser configured to leverage the first parsed context information when parsing the context information to obtain the second parsed context information.

2. The system of claim 1 wherein the context analyzer comprises a common context parser that is configured to perform an initial transformation of the context information received from the first context provider and the second context provider into a format that is common to each of the plurality of context parsers.

3. The system of claim 1 wherein the incident model generator is configured to determine the use of the first context provider and the second context provider by determining an associated identifier of thereof.

4. The system of claim 1 wherein the multiple architectural layers include one or more of an application server layer, a business object layer, a services layer, and a user interface (UI) layer.

5. The system of claim 1 wherein the plurality of context parsers are configured to parse the context information by determining extraction data associated with the first context provider and the second context provider and by extracting the context information based thereon into a target file according to a pre-defined structure.

6. The system of claim 1 wherein the first context provider provides context information as first eXtensible Mark-up Language (XML) data having a first format, and wherein the second context provider provides context information as second XML data having a second format, and wherein the plurality of context parsers are configured to parse the context information by extracting the first and second XML data in a uniform manner for use in constructing the incident model.

7. The system of claim 1 wherein the incident model generator is configured to provide the incident model in a graphical user interface (GUI) in which the entities are provided as graphical icons, each associated with one or more portions of the parsed context information that is relevant thereto.

8. The system of claim 1 comprising an access module configured to access metadata that is specific to a customer associated with the software application, and to enhance the parsed context information for one or more of the entities therewith.

9. The system of claim 8 wherein the metadata is associated with a software model from which the software application was created and configured for the customer.

10. The system of claim 1 wherein the first context provider is associated with a lower architectural layer and the second context provider is associated with a higher architectural layer.

11. The system of claim 1 wherein the incident model generator is configured to display the incident model in a graphical format illustrating the plurality of entities and links therebetween, and is further configured to translate the graphical format into a tree structure that illustrates the entities and links in a hierarchical fashion.

12. A method comprising:
    receiving, from a software support system associated with a software application associated with multiple architectural layers, an incident report associated with a software incident of the software application, the incident report including context information associated with the software application at the time of the software incident, the context information being received from a plurality of context providers including a first context provider associated with a first architectural layer of the software application and a second context provider associated with a second architectural layer of the software application;

determining a use of the first context provider and the second context provider from among the plurality of context providers;

activating a first context parser and a second context parser from the plurality of context parsers, based thereon;

parsing the context information at the first context parser and at the second context parser to obtain parsed context information including first parsed context information from the first context parser and second parsed context information from the second context parser, the second parsed context information obtained by the second context parser based on the first parsed context information;

determining, from the parsed context information, a plurality of entities and links therebetween that are associated with the software application; and displaying an incident model that includes the entities and the links and that provides access to the parsed context information on an entity-specific basis.

13. The method of claim 12 wherein parsing the context information comprises:

performing a transformation of the context information received from the first context provider and the second context provider into a format that is common to each of the plurality of context parsers, prior to performing the context parsing at the first context parser or the second context parser.

14. The method of claim 12 wherein parsing the context information comprises:

determining extraction data associated with the first context provider and the second context provider; and extracting the context information based thereon into a target file according to a pre-defined structure.

15. The method of claim 12 wherein determining, from the parsed context information, a plurality of entities and links therebetween that are associated with the software application, comprises:

accessing metadata that is specific to a customer associated with the software application; and enhancing the parsed context information for one or more of the entities therewith.

16. The method of claim 12 wherein the first context provider is associated with a lower architectural layer and the second context provider is associated with a higher architectural layer.

17. A system comprising:
a computing device; and
instructions stored on a computer readable medium and that, when executed on the computing device, cause the computing device to receive, from a software support system associated with a software application associated with multiple architectural layers, an incident report associated with a software incident of the software application, the incident report including context information associated with the software application at the time of the software incident, the context information being received from a plurality of context providers including a first context provider associated with a lower architectural layer of the software application and a second context provider associated with a higher architectural layer of the software application;

determine a use of the first context provider and the second context provider from among the plurality of context providers;

activate a first context parser and a second context parser from the plurality of context parsers, based thereon;

parse the context information at the first context parser to obtain first parsed context information;

parse the first parsed context information at the second context parser to obtain second parsed context information;

determine, from the first and second parsed context information, a plurality of entities and links therebetween that are associated with the software application; and display an incident model that includes the entities and the links and that provides access to the first and second parsed context information on an entity-specific basis.

18. The system of claim 17 wherein the multiple architectural layers include an application server layer, a business object layer, a services layer, and a user interface (UI) layer.

19. The system of claim 17 wherein the instructions, when executed on the computing device, cause the computing device to access metadata that is specific to a customer associated with the software application; and enhance the parsed context information for one or more of the entities therewith.

20. The system of claim 17 wherein the first and second context parsers are configured to parse the context information and the first parsed context information to obtain the second parsed context information by determining extraction data associated with the first context provider and the second context provider and by extracting the context information based thereon into a target file according to a pre-defined structure.

* * * * *